(12) United States Patent
Maekawa

(10) Patent No.: US 8,300,290 B2
(45) Date of Patent: Oct. 30, 2012

(54) PIEZOELECTRIC MIRROR DEVICE, OPTICAL EQUIPMENT INCORPORATING THE SAME, AND PIEZOELECTRIC MIRROR DEVICE FABRICATION PROCESS

(75) Inventor: Shinji Maekawa, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 343 days.

(21) Appl. No.: 12/306,608

(22) PCT Filed: Jun. 4, 2008

(86) PCT No.: PCT/JP2008/060630
§ 371 (c)(1),
(2), (4) Date: Dec. 24, 2008

(87) PCT Pub. No.: WO2008/150016
PCT Pub. Date: Dec. 11, 2008

(65) Prior Publication Data
US 2009/0284818 A1 Nov. 19, 2009

(30) Foreign Application Priority Data

Jun. 8, 2007 (JP) ................. 2007-152399
Apr. 15, 2008 (JP) ................. 2008-105650

(51) Int. Cl.
*G02B 26/08* (2006.01)
*G02B 26/10* (2006.01)
*G02B 26/12* (2006.01)
(52) U.S. Cl. .............. 359/200.8; 359/202.1
(58) Field of Classification Search .... 359/198.1–199.4, 359/200.6–200.8, 202.1, 221.2, 223.1–225.1, 359/226.2, 290–295, 838, 846, 871–872; 250/204, 559.06, 559.29, 230, 234; 347/225–260; 353/39, 98–99; 385/15–18, 22; 398/12, 19, 45
See application file for complete search history.

(56) References Cited

U.S. PATENT DOCUMENTS
5,903,380 A * 5/1999 Motamedi et al. ......... 359/224.1
(Continued)

FOREIGN PATENT DOCUMENTS
EP 1 542 059 A1 6/2005
(Continued)

OTHER PUBLICATIONS
Definition of "piezo-electric element," Newnes Dictionary of Electronics [online]. [retrieved on Apr. 27, 2011]. Retrieved from: http://www.xreferplus.com/entry.do?pp=1&id=755376.*
(Continued)

*Primary Examiner* — Stephone Allen
*Assistant Examiner* — Kimberly N Kakalec
(74) *Attorney, Agent, or Firm* — Oblon, Spivak, McClelland, Maier & Neustadt, L.L.P.

(57) ABSTRACT

A piezoelectric mirror device (11) comprises a frame portion (12) having a centrally located opening (13), a mirror portion (14) positioned at the opening (13), a pair of mirror support portions (15) adapted to support the mirror portion (14) rotatably relative the frame portion (12) and a pair of drive portions (16) that is a multilayer structure of lower electrodes (17), piezoelectric element (18) and an upper electrode (19). The mirror support portions (15) are formed of a material having a Young's modulus of up to 160 GPa, and the frame portion (12) includes a cutout (13a) at a part of a site wherein there are the drive portions (16) positioned. The cutout (13a) is in contact with the opening (13).

9 Claims, 27 Drawing Sheets

U.S. PATENT DOCUMENTS

| | | |
|---|---|---|
| 6,681,063 B1 | 1/2004 | Kane et al. |
| 2002/0149834 A1 | 10/2002 | Mei et al. |
| 2003/0053156 A1 | 3/2003 | Satoh et al. |
| 2005/0078169 A1* | 4/2005 | Tumer .................. 347/260 |
| 2005/0231793 A1* | 10/2005 | Sato .................. 359/291 |
| 2006/0012844 A1* | 1/2006 | Fujii et al. .................. 359/224 |
| 2006/0245023 A1 | 11/2006 | Akedo et al. |
| 2007/0024951 A1* | 2/2007 | Mochizuki et al. .......... 359/291 |
| 2007/0047046 A1 | 3/2007 | Ji |
| 2007/0064299 A1* | 3/2007 | Dewa .................. 359/291 |

FOREIGN PATENT DOCUMENTS

| | | |
|---|---|---|
| JP | 7-84196 | 3/1995 |
| JP | 2924200 | 5/1999 |
| JP | 2003-66361 | 3/2003 |
| JP | 2003 075738 A | 12/2003 |
| JP | 2006-293116 | 10/2006 |
| JP | 2006-320089 | 11/2006 |
| JP | 2007-65649 | 3/2007 |
| JP | 2007-94146 | 4/2007 |
| WO | WO 2004/017119 A1 | 2/2004 |

OTHER PUBLICATIONS

Hsu, T. R. Lectures on MEMS and Microsystems Design and Manufacture, Chapter 7: Materials for MEMS and Microsystems, p. 11 [online]. [retrieved on Apr. 27, 2011]. Retrieved from: http://www.engr.sjsu.edu/trhsu/ME189_Chapter 7.pdf.*

Supplementary European Search Report in PCT Appl. No. JP2008060630 filed Jun. 4, 2008.

* cited by examiner

US 8,300,290 B2

PIEZOELECTRIC MIRROR DEVICE, OPTICAL EQUIPMENT INCORPORATING THE SAME, AND PIEZOELECTRIC MIRROR DEVICE FABRICATION PROCESS

ART FIELD

The present invention relates generally to a mirror device, and more specifically to a piezoelectric mirror device that uses a piezoelectric element for driving a mirror portion, optical equipment incorporating that piezoelectric mirror device, and a piezoelectric mirror device fabrication process.

BACKGROUND ART

Designed to drive a mirror surface to change a reflection path taken by light depending on its angle of rotation, a mirror device has so far been used for, e.g., optical equipments harnessing laser such as printers, copiers, displays, and projectors. The mirror surface of the mirror device is driven in an electrostatic drive mode using electrostatic force, a piezoelectric drive mode utilizing a piezoelectric element, and an electromagnetic drive mode using electromagnetic force (JP(A)'s 2001-13443, 2002-311376 and 2003-15064).

Of prior art mirror devices, a piezoelectric mirror device of the piezoelectric drive mode has an advantage of being higher in driving power than those of other drive modes. For instance, it has been fabricated by means of an MEMS (Micro-Electro-Mechanical systems), with a mirror portion formed by etching an SOI substrate and a mirror support portion for that mirror portion in a rotatable manner.

However, a problem with the conventional piezoelectric mirror device is that the amount of displacement of the mirror portion is limited, because the mirror support portion is made of a silicon layer (Si) of high rigidity (having a Young's modulus of 166 GPa). For the fabrication of the mirror support portion or the like, it is required to make use of an SOI substrate having a silicon oxide that provides an etching stopper; that SOI substrate costs much, placing some limitations on fabrication cost reductions.

DISCLOSURE OF THE INVENTION

The present invention has for its object the provision of a piezoelectric mirror device having a mirror portion with an increased amount of displacement, a fabrication process for the simplified fabrication of such a piezoelectric mirror device, and optical equipments incorporating such a piezoelectric mirror device.

According to one embodiment of the invention, that object is accomplishable by the provision of a piezoelectric mirror device, which comprises a frame portion having a centrally located opening, a pair of drive portions that are a multilayer structure of a lower electrode, a piezoelectric element and an upper electrode and located at said frame portion, a mirror portion positioned at said opening, and a pair of mirror support portions adapted to support said mirror portion rotatably relative to said frame portion depending on the operation of said drive portions, wherein said mirror support portions are formed of a material having a Young's modulus of up to 160 GPa, and said frame portion includes a cutout or thinner portion at a part of a site wherein there are said drive portions positioned, wherein said cutout or thinner portion is in contact with said opening.

In another embodiment of the invention, said mirror support portions are formed integrally with the lower electrode constituting a part of said drive portions.

In yet another embodiment of the invention, said mirror support portions are locked at ends to the lower electrode constituting a part of said drive portions.

In a further embodiment of the invention, said mirror support portions are locked at ends to the thinner portion of said frame portion.

In a further embodiment of the invention, said mirror support portions are formed integrally with the upper electrode constituting a part of said drive portions.

In a further embodiment of the invention, said mirror portion and said mirror support portions are formed integrally.

In a further embodiment of the invention, said mirror portion has a mirror surface formed of a material different from that of said mirror support portions.

In a further embodiment of the invention, said mirror support portions are located in opposite directions via said mirror portion and coaxially.

In a further embodiment of the invention, the axial center of said mirror support portions is off the center of said mirror portion.

A further embodiment of the invention is directed to a piezoelectric mirror device, which comprises an inner frame portion defined by said frame portion, X-axis mirror support portions defined by said mirror support portions and X-axis drive portions defined by said drive portions, and further comprises an outer frame portion positioned in such a way as to surround said inner frame portion via the opening, a pair of Y-axis drive portions that are a multilayer structure of the lower electrode, the piezoelectric element and the upper electrode and located at said outer frame portion, and a pair of Y-axis mirror support portions adapted to support said inner frame portion rotatably relative to said outer framer portion depending on operation of said Y-axis drive portions, wherein said Y-axis mirror support portions are formed of a material having a Young's modulus of up to 160 GPa, and said outer frame portion includes a cutout or thinner portion at a part of a site where there are the Y-axis drive portions positioned, wherein said cutout or thinner portion is in contact with said opening, said X-axis is orthogonal to said Y-axis, and said mirror portion is biaxially rotatable and displaceable.

The invention also provides optical equipment, which comprises a light source, a projection screen and an optical system adapted to guide light leaving said light source to said projection screen, wherein said optical system includes any one of the piezoelectric mirror devices as recited above.

Further, the invention provides a piezoelectric mirror device fabrication process, which comprises:

a step of dividing a silicon wafer into a multiplicity of segments, wherein on one surface of said silicon wafer per segment, a pair of lower electrodes, a mirror portion positioned between said lower electrodes and a pair of mirror support portions adapted to join said mirror portion to said lower electrodes are formed of an electrically conductive material having a Young's modulus of up to 160 GPa and a melting point higher than that of a piezoelectric element to be formed later, a step of stacking the piezoelectric element and an upper electrode on said lower electrodes in this order to prepare a pair of drive portions that are a multilayer structure of the lower electrodes, the piezoelectric element and the upper electrode, a step of removing the silicon wafer in a desired pattern from another surface of said silicon wafer per segment to form an opening thereby preparing a frame portion, wherein said mirror portion is rotatably supported by said mirror support portions at said opening, and at a part of a site of said frame portion where there are said drive portions positioned, a cutout or thinner portion is formed in contact with said opening to obtain a multiplicity of piezoelectric mirror devices, and a step of dicing said multiplicity of piezoelectric mirror devices into individual ones.

Further, the invention provides a piezoelectric mirror device fabrication process, which comprises:

a step of dividing a silicon wafer into a multiplicity of segments, wherein on one surface of said silicon wafer per segment, a pair of lower electrodes, a piezoelectric element on said lower electrodes and an upper electrode are stacked in this order to prepare a pair of drive portions that are a multilayer structure of the lower electrodes, the piezoelectric element and the upper electrode, a step of forming a mirror portion positioned between said drive portions and a pair of mirror support portions extending from said mirror portion toward said drive portions of a material having a Young's modulus of up to 160 GPa such that said mirror support portions are locked at ends to the lower electrodes constituting a part of said drive portions, a step of removing the silicon wafer in a desired pattern from another surface of said silicon wafer per segment to form an opening thereby preparing a frame portion, wherein said mirror portion is rotatably supported by said mirror support portions at said opening, and at a part of a site of said frame portion where there are said drive portions positioned, a cutout or thinner portion is formed in contact with said opening to obtain a multiplicity of piezoelectric mirror devices, and a step of dicing said multiplicity of piezoelectric mirror devices into individual ones.

Further, the invention provides a piezoelectric mirror device fabrication process, which comprises:

a step of dividing a silicon wafer into a multiplicity of segments, wherein on one surface of said silicon wafer per segment, a pair of lower electrodes, a mirror portion positioned between said lower electrodes and a pair of mirror support portions extending from said mirror portion down toward said lower electrodes are formed of an electrically conductive material having a Young's modulus of up to 160 GPa and a melting point higher than that of a piezoelectric element to be formed later, a step of stacking the piezoelectric element and an upper electrode on said lower electrodes in this order to prepare a pair of drive portions that are a multilayer structure of the lower electrodes, the piezoelectric element and the upper electrode, a step of removing the silicon wafer in a desired pattern from another surface of said silicon wafer per segment to form an opening thereby preparing a frame portion, wherein said mirror portion is rotatably supported by said mirror support portions at said opening, and at a part of a site of said frame portion where there are said drive portions positioned, a thinner portion is formed in such a way as to be in contact with said opening and lock ends of said mirror support portions to obtain a multiplicity of piezoelectric mirror devices, and a step of dicing said multiplicity of piezoelectric mirror devices into individual ones.

Further, the invention provides a piezoelectric mirror device fabrication process, which comprises:

a step of dividing a silicon wafer into a multiplicity of segments, wherein on one surface of said silicon wafer per segment, a pair of lower electrodes, a piezoelectric element on said lower electrodes and an upper electrodes are stacked together in this order to prepare a pair of drive portions that are a multilayer structure of the lower electrodes, the piezoelectric element and the upper electrode, a step of forming a mirror portion positioned between said drive portions and a pair of mirror support portions extending from said mirror portion toward said drive portions of a material having a Young's modulus of up to 160 GPa, a step of removing the silicon wafer in a desired pattern from another surface of said silicon wafer per segment to form an opening thereby preparing a frame portion, wherein said mirror portion is rotatably supported by said mirror support portions at said opening, and at a part of a site of said frame portion where there are said drive portions positioned, a thinner portion is formed in such a way as to be in contact with said opening and lock ends of said mirror support portions to obtain a multiplicity of piezoelectric mirror devices, and a step of dicing said multiplicity of piezoelectric mirror devices into individual ones.

Further, the invention provides a piezoelectric mirror device fabrication process, which comprises:

a step of dividing a silicon wafer into a multiplicity of segments, wherein on one surface of said silicon wafer per segment, a pair of lower electrodes and a piezoelectric element on said lower electrodes are formed, a step of forming a resist layer such that a surface of said piezoelectric element is exposed and making said resist layer flat, then forming an upper electrode positioned on said piezoelectric element, a mirror portion positioned halfway between said piezoelectric elements and a pair of mirror support portions adapted to join said mirror portion to said upper electrode of an electrically conductive material having a Young's modulus of up to 160 GPa to prepare a pair of drive portions that are a multilayer structure of the lower electrodes, the piezoelectric element and the upper electrode, and then removing said resist, a step of removing the silicon wafer in a desired pattern from another surface of said silicon wafer per segment to form an opening thereby preparing a frame portion, wherein said mirror portion is rotatably supported by said mirror support portions at said opening, and at a part of a site of said frame portion where there are said drive portions positioned, a cutout or thinner portion is formed in contact with said opening to obtain a multiplicity of piezoelectric mirror devices, and a step of dicing said multiplicity of piezoelectric mirror devices into individual ones.

Such an inventive piezoelectric mirror device has mirror support portions formed of a material having a Young's modulus of up to 160 GPa, and a frame portion wherein at a part of the site where there are drive portions positioned, there is a cutout or thinner portion provided; so it is more increased than a conventional piezoelectric mirror device in the amount of displacement of the mirror portion due to the piezoelectric element so that there can be a widening of the scan range of laser light scanners for, e.g., printers, copiers, and projectors.

The inventive fabrication process makes use of silicon wafers or dispenses with the use of SOI wafers having a silicon oxide layer, contributing more to fabrication cost reductions.

BRIEF DESCRIPTION OF THE DRAWINGS

FIG. 18 is a sectional view of the piezoelectric mirror device shown in FIG. 17.

FIG. 20 is a sectional view of the piezoelectric mirror device shown in FIG. 19.

FIG. 26 is a sectional view of the piezoelectric mirror device shown in FIG. 25.

FIG. 29 is illustrative of the upper electrode of the piezoelectric mirror device shown in FIG. 25.

BEST MODE FOR CARRYING OUT THE INVENTION

Embodiments of the invention are now explained with reference to the accompanying drawings.

[Piezoelectric Mirror Device]

Figure 1:
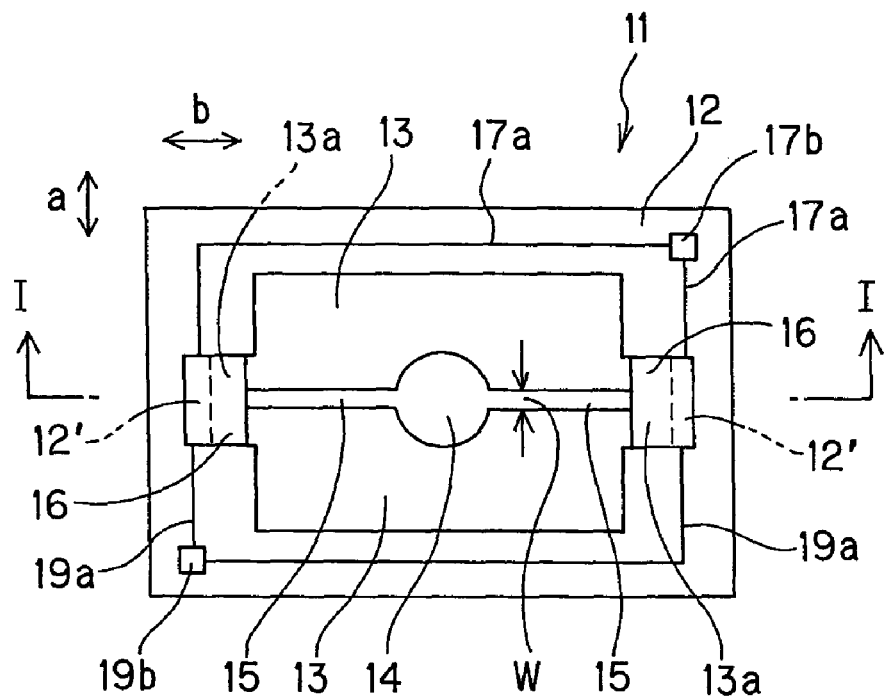
FIG. 1 is a plan view of one embodiment of the inventive piezoelectric mirror device.
Figure 2:
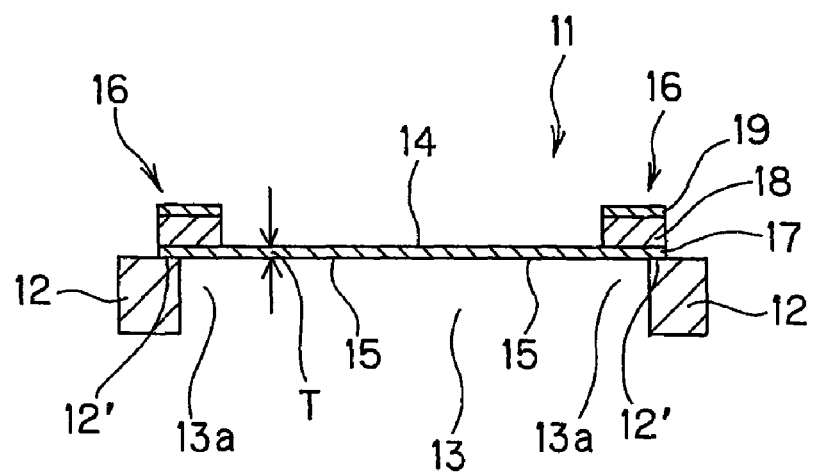
FIG. 2 is a sectional view of the piezoelectric mirror device shown in FIG. 1, as taken on arrowed line I-I.

(1) FIG. 1 is a plan view of one embodiment of the inventive piezoelectric mirror device, and FIG. 2 is a sectional view of the piezoelectric mirror device shown in FIG. 1, as taken on arrowed line I-I. Referring to FIGS. 1 and 2, a piezoelectric mirror device 11 of the invention comprises a frame portion 12 having a centrally located opening 13, a mirror portion 14 positioned at the opening 13, a pair of mirror support portions 15 adapted to support the mirror portion 14 rotatably relative to the frame portion 12, and a pair of drive portions 16 that are a multilayer structure of a lower electrode 17, a piezoelectric element 18 and an upper electrode 19 and located at the frame portion 12. And in the invention, the mirror support portions 15 are made of a material having a Young's modulus of up to 160 GPa, preferably 30 to 150 GPa, and more preferably 60 to 130 GPa. The frame portion 12 includes a cutout 13a at a part of the site where there are the drive portions 16 positioned, and that cutout 13a is in contact with the opening 13. It is not preferable that the Young's modulus of the mirror support portions 15 exceeds 160 GPa, because the rigidity of the mirror support portions 15 grows high; so the amount of displacement of the mirror portion 14 due to the driving portions 16 grows small.

It is here noted that the lower electrode 17 is connected to a terminal 17b via a wire 17a, and that the upper electrode 19 is connected to a terminal 19b via a wire 19a.

The frame member 12 forming a part of the piezoelectric mirror device 11 is made of silicon, and may have any desired thickness optionally selected from the range of about 300 μm to 1 mm.

The opening 13 formed in the frame 12 defines a space in which the mirror portion 14 supported by a pair of mirror support portions 15 is positioned, and the mirror portion 14 is rotated by the drive portions 16 relative to the frame portion 12. Although such opening 13 is configured into a rectangle as shown, it is understood that there is no special limitation on it as long as it is configured and sized in such a way as not to interfere with the rotation of the mirror portion 14.

Figure 3:
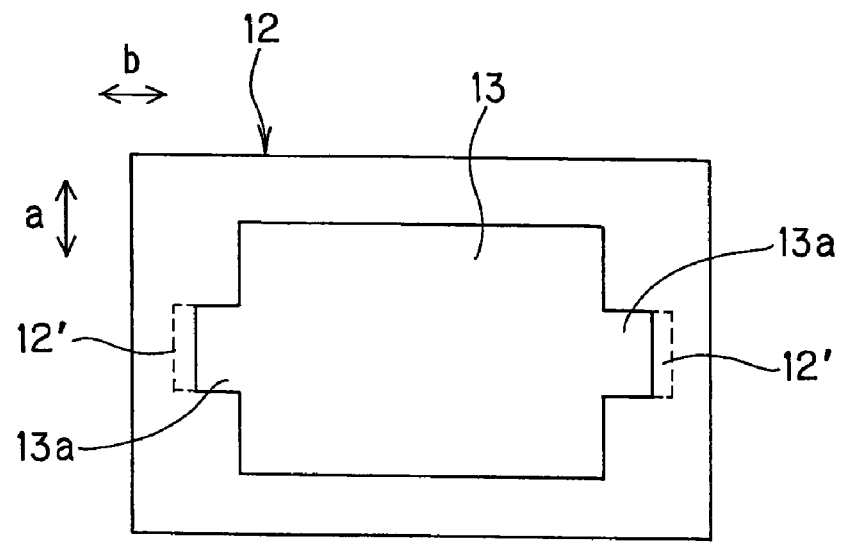
FIG. 3 is illustrative of the frame portion of the piezoelectric mirror device shown in FIG. 1.

As shown in FIG. 3, the cutout 13*a* that the frame portion 12 has is formed in contact with the opening 13. There is no special limitation on the configuration and size of the cutout 13*a* provided that there is no interference with the displacement of the mirror supports 15 and the mirror portion 14 due to the deformation of the drive portions 16. In the embodiment shown, the cutout 13*a* is almost the same as the drive portions 16 in a widthwise direction (indicated by an arrow a in FIGS. 1 and 3), and configured such that a support site 12' for supporting the drive portions 16 is left in the frame portion 12 in a lengthwise direction (indicated by an arrow b in FIGS. 1 and 3). In that case, the area of the support site 12' may be set at up to 50%, preferably 10 to 30% of the area of projection of the piezoelectric element 18 forming a part of the drive portions 16 in a thickness-wise direction.

In the piezoelectric mirror device 11, the mirror portion 14, the mirror support portions 15 and the lower electrode 17 are formed integrally of an electrically conductive material having a Young's modulus of up to 160 GPa, preferably 30 to 150 GPa, and more preferably 60 to 130 GPa, and the mirror portion 14 may have any desired shape and area. The mirror support portions 15 are located such that they are coaxially opposite to each other with the mirror portion 14 interposed between them. Such mirror portion 14 and mirror support portions 15 levitate over the aforesaid opening 13; so to have structural resistance, they may have any desired thickness T optionally selected from the range of at least 500 nm, and preferably 1 to 100 μm. The mirror support portions 15 may have any desired width W determined in consideration of structural resistance and the rotation of the mirror portion 14 and optionally selected from the range of, e.g., 1 to 50 μm.

Electrically conductive materials having a Young's modulus of up to 160 GPa, for instance, include Al (70.3 GPa), Au (78.0 GPa), Ag (82.7 GPa), Cu (130 GPa), Zn (108.0 GPa), and Ti (115.7 GPa), which may be used alone or in a multilayer structure form comprising two or more. Even electrically conductive materials having a Young's modulus of greater than 160 GPa, for instance, Pt (168 GPa), Ni (199 GPa), steel (201.0 GPa), and Fe (211.4 GPa) may be used in the event that in combination with an electrically conductive material(s) having a Young's modulus of up to 160 GPa, they provide a multilayer structure having a Young's modulus of up to 160 GPa. Throughout the disclosure here, it is understood that the Young's modulus of the multilayer structure is defined by dividing the sum of the product of the Young's modulus and thickness of each electrically conductive material by the sum of the thickness of each electrically conductive material. For instance, the Young's modulus of a multilayer structure comprising an electrically conductive material 1 having a Young's modulus $E_1$ and a thickness $T_1$ and an electrically conductive material 2 having a Young's modulus $E_2$ and a thickness $T_2$ may be figured out from the following equation:

$$E=[(E_1 \times T_1)+(E_2 \times T_2)]/(T_1+T_2)$$

It is here noted that the axial center of the mirror support portions 15 is in alignment with the center of the mirror portion 14 in the embodiment shown; however, if the axial center of the mirror support portions 15 is off the center of the mirror portion 14, it is then possible to improve the ability of the mirror portion to rotate a lot more.

It is also noted that when the light reflectance of the electrically conductive material used for the mirror portion 14, the mirror support portions 15, and the lower electrode 17 is insufficient, the mirror portion 14 may as well have a reflective layer formed of, e.g., Al, Ag, Rh, Au, Cu, Ni or the like.

The piezoelectric element 18 forming a part of the drive portions 16 may be formed of conventionally known piezoelectric materials such as lead titanate zirconate (PZT), barium titanate (BTO), lead titanate (PTO), lithium niobate ($LiNbO_3$), lithium tantalate ($LiTaO_3$), and lithium tetraborate ($Li_2B_4O_7$). The piezoelectric element 18 may have any desired thickness optionally selected from the range of, e.g., 5 to 100 μm.

The upper electrode 19 forming a part of the drive portions 16 may be formed of Pt, Au, Ag, Pd, Cu, Sn and so on alone or in combination of two or more. It may also be formed of a multilayer structure comprising an underlay metal layer of Cr, Ti, Mo, Ta or the like and a surface layer formed of the aforesaid metal(s) and located on the underlay metal layer. The upper electrode 19 may have any desired thickness optionally selected from the range of, e.g., 300 nm to 5 μm.

Figure 4:
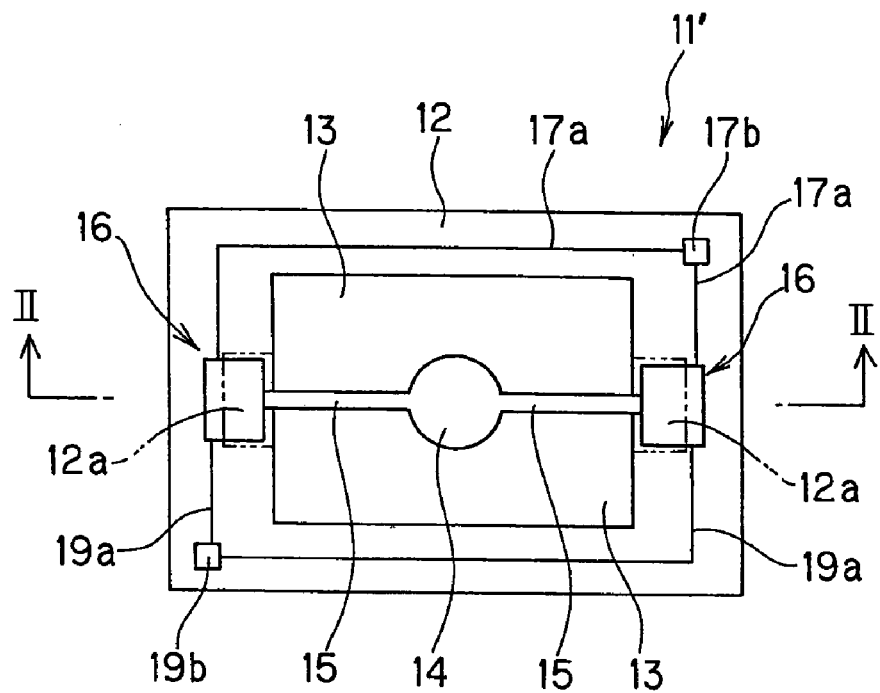
FIG. 4 is a plan view of another embodiment of the inventive piezoelectric mirror device.
Figure 5:
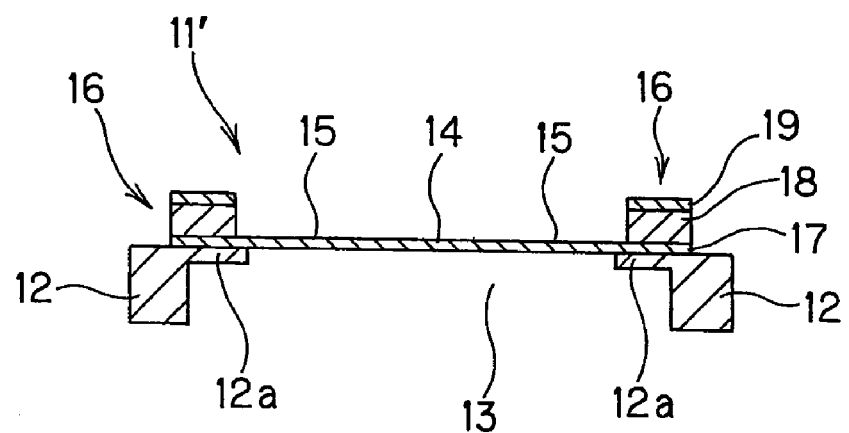
FIG. 5 is a sectional view of the piezoelectric mirror device shown in FIG. 4, as taken on arrowed line II-II.

FIG. 4 is a plan view of another embodiment of the inventive piezoelectric mirror device, and FIG. 5 is a sectional view of the piezoelectric mirror device shown in FIG. 4, as taken on arrowed line II-II. Referring to FIGS. 4 and 5, a piezoelectric mirror device 11' of the invention is the same as the aforesaid piezoelectric mirror device 11 with the exception that of the frame portion 12, a part of the site where there are the drive portions 16 positioned includes a thinner portion 12*a* instead of the aforesaid cutout 13*a*. Therefore, like parts are indicated by like numerals; so their explanations are left out.

Figure 6:
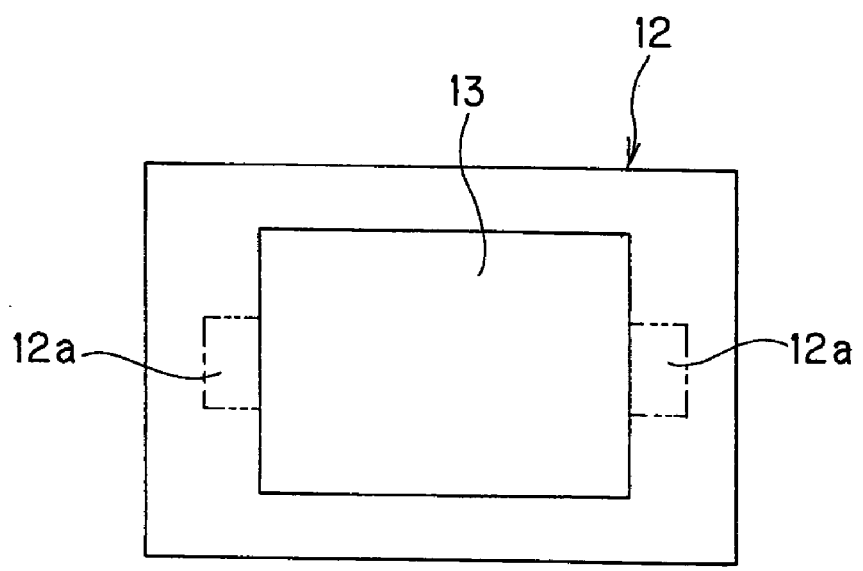
FIG. 6 is illustrative of the frame portion of the piezoelectric mirror device shown in FIG. 4.

As shown in FIG. 6, the thinner portion 12*a* that the frame 12 has is formed in contact with the opening 13. There is no special limitation on the configuration and size of that thinner portion 12*a* provided that there is no interference with the displacement of the mirror support portions 15 and the mirror portion 14 due to the deformation of the drive portions 16. In the embodiment shown, the thinner portion 12*a* is configured such that it is positioned substantially under and all over the drive portions 16. The thinner portion 12*a* may have any desired thickness optionally selected from the range of e.g., up to 50 μm, and preferably 1 to 30 μm.

With such piezoelectric mirror device 11, 11', for instance, the terminal 17*b* (lower electrode 17) side is at a GND potential, and as the desired ac voltage is applied to the upper electrode 19 via the terminal 19*b*, it enables the mirror portion 14 to displace at any desired resonant frequency. And the mirror support portions 15 are formed of a material having a Young's modulus of up to 160 GPa and the frame portion 12 includes the cutout 13*a* or thinner portion 12*a* at a part of the site where there are the drive portions positioned: the piezoelectric mirror device 11, 11' is much larger in the amount of displacement of the mirror portion by the piezoelectric element than conventional ones.

Figure 7:
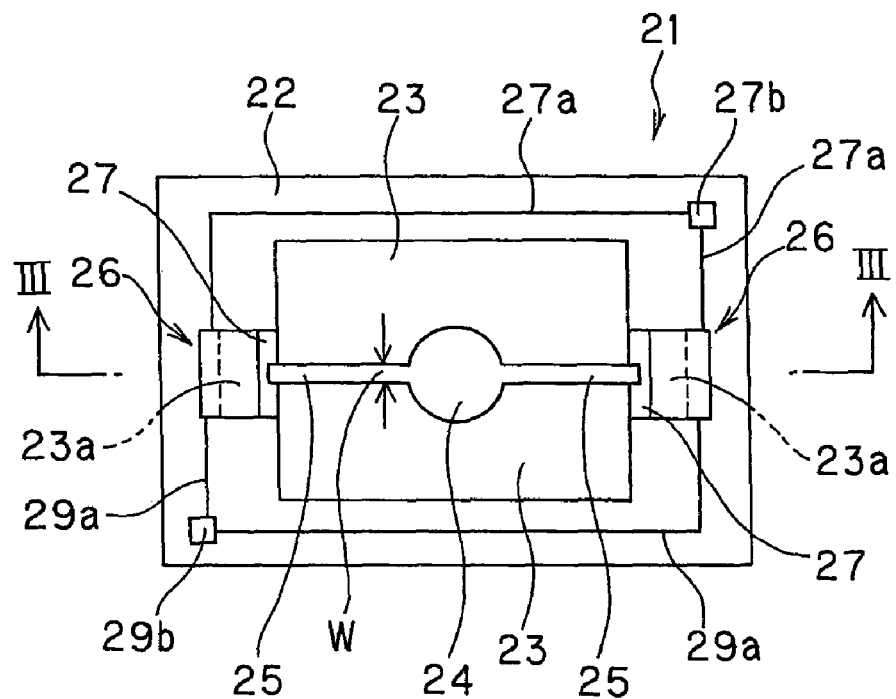
FIG. 7 is a plan view of yet another embodiment of the inventive piezoelectric mirror device.
Figure 8:
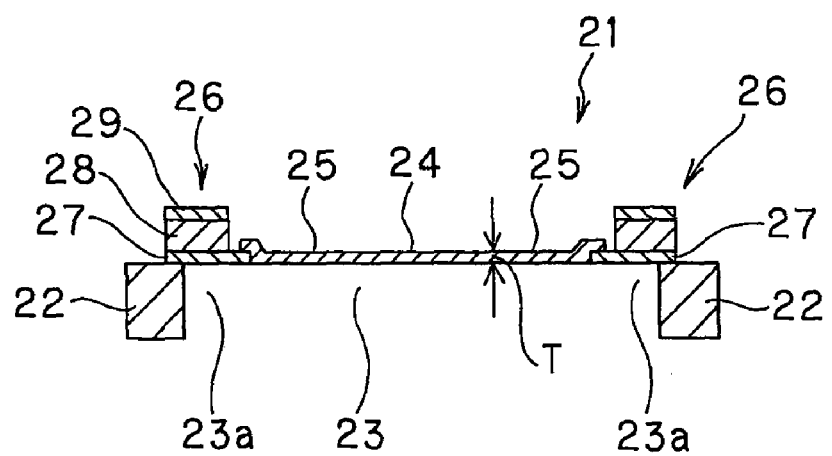
FIG. 8 is a sectional view of the piezoelectric mirror device shown in FIG. 7, as taken on arrowed line III-III.

(2) FIG. 7 is a plan view of yet another embodiment of the inventive piezoelectric mirror device, and FIG. 8 is a sectional view of the piezoelectric mirror device shown in FIG. 7, as taken on arrowed line III-III. Referring to FIGS. 7 and 8, a piezoelectric mirror device 21 of the invention comprises a frame portion 22 having a centrally located opening 23, a mirror portion 24 positioned at the opening 23, a pair of mirror support portions 25 adapted to support the mirror portion 24 rotatably relative to the frame portion 22, and a pair of drive portions 26 that are a multilayer structure of a lower electrode 27, a piezoelectric element 28 and an upper electrode 29 and located at the frame portion 22. The aforesaid mirror support portion 25 is made of a material having a Young's modulus of up to 160 GPa, preferably 30 to 150 GPa, and more preferably 60 to 130 GPa. The frame portion 22 includes a cutout 23*a* at a part of the site where there are the drive portions 26 positioned, and that cutout 23a is in contact with the opening 23. It is not preferable that the Young's modulus of the mirror support portions 25 exceeds 160 GPa, because the rigidity of the mirror support portions 25 grows high; so the amount of displacement of the mirror portion 24 due to the driving portions 26 grows small.

It is here noted that the lower electrode 27 is connected to a terminal 27b via a wire 27a, and that the upper electrode 29 is connected to a terminal 29b via a wire 29a.

The frame member 22 forming a part of the piezoelectric mirror device 21 is the same as the frame portion 12 in the aforesaid embodiment, and the opening 23 and cutout 23a may be provided as is the case with the aforesaid opening 13 and cutout 13a.

In the piezoelectric mirror device 21, the mirror portion 24 and the mirror support portions 25 are formed integrally of an electrically conductive material having a Young's modulus of up to 160 GPa, preferably 30 to 150 GPa, and more preferably 60 to 130 GPa, and the mirror portion 24 may have any desired shape and area. The mirror support portions 25 are located such that they are coaxially opposite to each other with the mirror portion 24 interposed between them. The ends of each mirror support portion 25 are locked to the lower electrode 27 forming a part of the drive portions 26. Such mirror portion 24 and mirror support portions 25 levitate over the aforesaid opening 23; so to have structural resistance, they may have any desired thickness T optionally selected from the range of at least 500 nm, and preferably 1 to 100 µm. The mirror support portions 25 may have a width W determined in consideration of structural resistance and the rotation of the mirror portion 24 and optionally selected from the range of, e.g., 1 to 50 µm.

For the material having a Young's modulus of up to 160 GPa, there is the mention of the electrically conductive materials mentioned in connection with the aforesaid embodiment as well as insulating materials such as polyethylene, polystyrene, and polyimide. Such materials may be used alone or in a multilayer structure form comprising two or more. Even materials having a Young's modulus of greater than 160 GPa may be used in the event that in combination with the material(s) having a Young's modulus of up to 160 GPa, they provide a multilayer structure having a Young's modulus of up to 160 GPa.

It is here noted that the axial center of the mirror support portions 25 is in alignment with the center of the mirror portion 24 in the embodiment shown; however, if the axial center of the mirror support portions 25 is off the center of the mirror portion 24, it is then possible to improve the ability of the mirror portion to rotate a lot more.

It is also noted that when the light reflectance of the material used for the mirror portion 24 and the mirror support portions 25 is insufficient, the mirror portion 24 may as well have a reflective layer having a higher light reflectance. For such a reflective layer, the same materials as already mentioned may just as well be used.

The lower electrode 27 forming a part of the drive portions 26 extends more on the side of the opening 23 than the piezoelectric element 28 or upper electrode 29, and the ends of the mirror support portions 25 are locked to that extension site. Such lower electrode 27 may be formed of Pt, Au, Ag, Pd, Cu, Sn and so on alone or in combination of two or more. It may also be formed of a multilayer structure comprising an underlay metal layer of Cr, Ti, Mo, Ta or the like and a surface layer formed of the aforesaid metal(s) and located on the underlay metal layer. The lower electrode 27 may have any desired thickness optionally selected from the range of, e.g., 300 nm to 5 µm.

The piezoelectric element 28 and upper electrode 29 forming the drive portion 26 may be the same as the piezoelectric element 18 and upper electrode 19 forming the drive portions 16 in the aforesaid embodiment.

Figure 9:
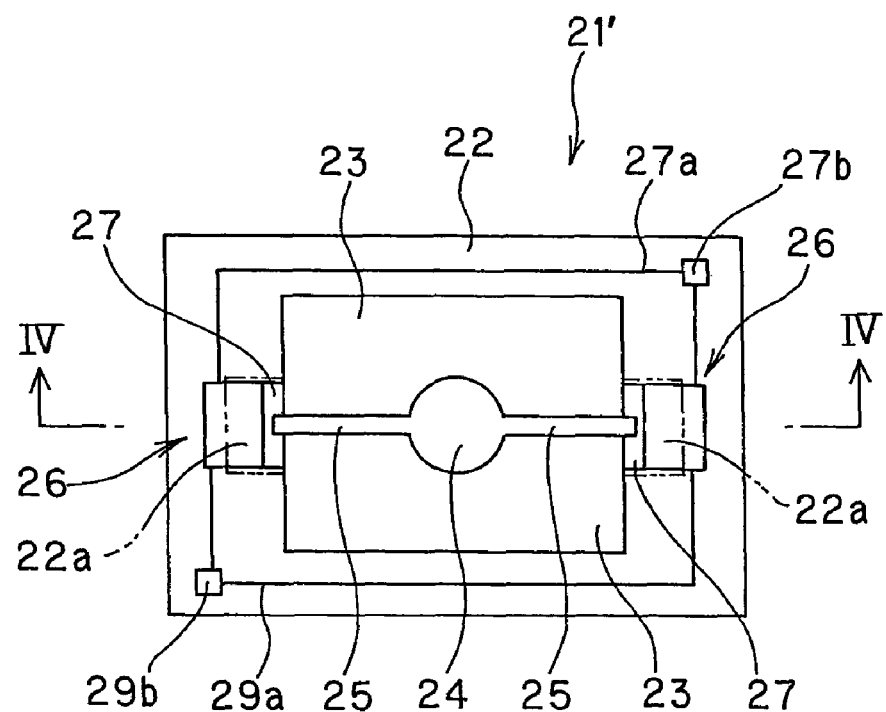
FIG. 9 is a plan view of a further embodiment of the inventive piezoelectric mirror device.
Figure 10:
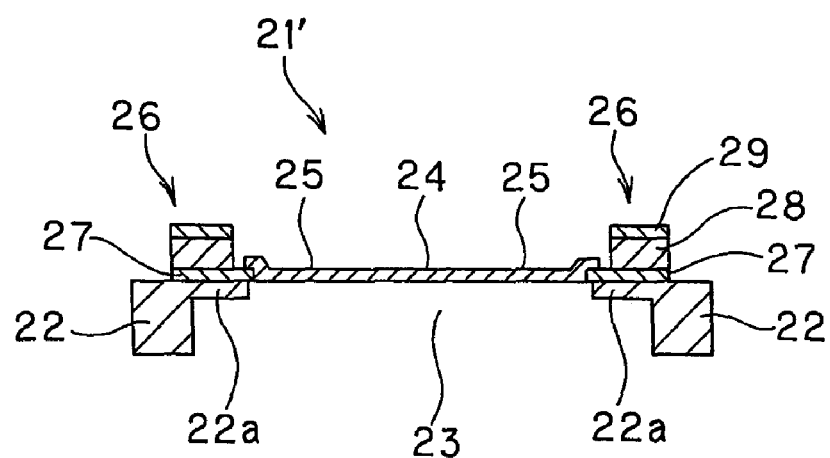
FIG. 10 is a sectional view of the piezoelectric mirror device shown in FIG. 9, as taken on arrowed line IV-IV.

FIG. 9 is a plan view of a further embodiment of the inventive piezoelectric mirror device, and FIG. 10 is a sectional view of the piezoelectric mirror device shown in FIG. 9, as taken on arrowed line IV-IV. Referring to FIGS. 9 and 10, a piezoelectric mirror device 21' of the invention is the same as the aforesaid piezoelectric mirror device 21 with the exception that of the frame portion 22, a part of the site where there are the drive portions 26 positioned includes a thinner portion 22a instead of the aforesaid cutout 23a, and that thinner portion 22a is in contact with the opening 23. Therefore, like parts are indicated by like numerals; so their explanations are left out.

There is no special limitation on the configuration and size of that thinner portion 22a that the frame 22 includes, provided that there is no interference with the displacement of the mirror support portions 25 and the mirror portion 24 due to the deformation of the drive portions 26. In the embodiment shown, the thinner portion 22a is configured such that it is positioned substantially under and all over the drive portions 26. The thinner portion 22a may have any desired thickness optionally selected from the range of e.g., up to 50 µm, and preferably 1 to 30 µm.

With such piezoelectric mirror device 21, 21', for instance, the terminal 27b (lower electrode 27) side is at a GND potential, and as the desired ac voltage is applied to the upper electrode 29 via the terminal 29b, it enables the mirror portion 24 to displace at any desired resonant frequency. And the mirror support portions 25 are formed of the material having a Young's modulus of up to 160 GPa and the frame portion 22 includes the cutout 23a or thinner portion 22a at a part of the site where there are the drive portions 26 positioned: the piezoelectric mirror device 21, 21' is much larger in the amount of displacement of the mirror portion due to the piezoelectric element than conventional ones.

Figure 11:
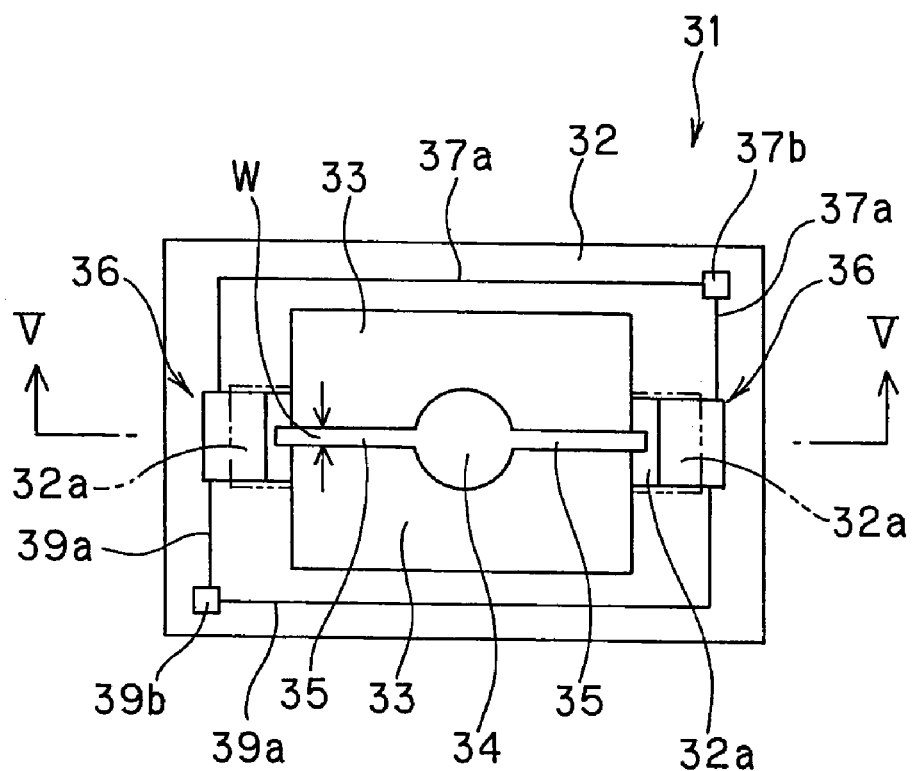
FIG. 11 is a plan view of a further embodiment of the inventive piezoelectric mirror device.
Figure 12:
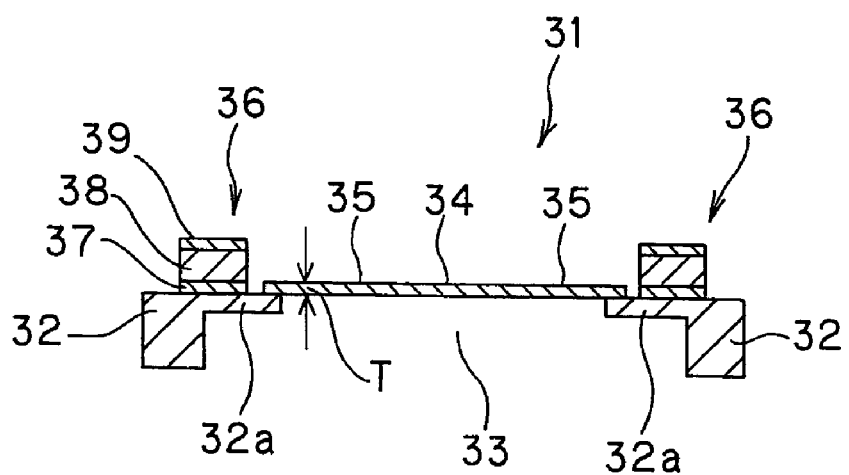
FIG. 12 is a sectional view of the piezoelectric mirror device shown in FIG. 11, as taken on arrowed line V-V.

(3) FIG. 11 is a plan view of a further embodiment of the inventive piezoelectric mirror device, and FIG. 12 is a sectional view of the piezoelectric mirror device shown in FIG. 11, as taken on arrowed line V-V. Referring to FIGS. 11 and 12, a piezoelectric mirror device 31 of the invention comprises a frame portion 32 having a centrally located opening 33, a mirror portion 34 positioned at the opening 33, a pair of mirror support portions 35 adapted to support the mirror portion 34 rotatably relative to the frame portion 32, and a pair of drive portions 36 that are a multilayer structure of a lower electrode 37, a piezoelectric element 38 and an upper electrode 39 and located at the frame portion 32. The aforesaid mirror support portions 35 are each made of a material having a Young's modulus of up to 160 GPa, preferably 30 to 150 GPa, and more preferably 60 to 130 GPa. The frame portion 32 includes a thinner portion 32a at a part of the site where there are the drive portions 36 positioned, and that thinner portion 32a is in contact with the opening 33. It is not preferable that the Young's modulus of the mirror support portions 35 exceeds 160 GPa, because the rigidity of the mirror support portions 35 grows high; so the amount of displacement of the mirror portion 34 due to the drive portions 36 grows small.

It is here noted that the lower electrode 37 is connected to a terminal 37b via a wire 37a, and that the upper electrode 39 is connected to a terminal 39b via a wire 39a.

The frame member 32 forming a part of the piezoelectric mirror device 31 is formed of silicon, and may have any desired thickness optionally selected from the range of about 300 μm to 1 mm.

The opening 33 formed in the frame 32 defines a space in which the mirror portion 34 supported by a pair of mirror support portions 35 is positioned, and the mirror portion 34 is rotated by the drive portions 36 relative to the frame portion 32. Although such opening 33 is configured into a rectangle as shown, it is understood that there is no special limitation on it as long as it is configured and sized in such a way as not to interfere with the rotation of the mirror portion 34.

There is no special limitation on the configuration and size of the thinner portion 32a that the frame portion 32 includes, provided that there is no interference with the displacement of the mirror support portions 35 and the mirror portion 34 due to the deformation of the drive portions 36. In the embodiment shown, the thinner portion 32a is positioned almost under the drive portions 36, and extends more on the side of the opening 33 than the drive portions 36, with the ends of the mirror support portions 35 locked to that extension site. Such thinner portion 32a may have any desired thickness optionally selected from the range of, e.g., up to 50 μm, and preferably 1 to 30 μm.

In the piezoelectric mirror device 31, the mirror portion 34 and the mirror support portions 35 are formed integrally of a material having a Young's modulus of up to 160 GPa, preferably 30 to 150 GPa, and more preferably 60 to 130 GPa, and the mirror portion 34 may have any desired shape and area. The mirror support portions 35 are located such that they are coaxially opposite to each other with the mirror portion 34 interposed between them, and the end of each mirror support portion 35 is locked to the thinner portion 32a of the frame portion 32. Such mirror portion 34 and mirror support portions 35 levitate over the aforesaid opening 33; so to have structural resistance, they may have any desired thickness T optionally selected from the range of at least 500 nm, and preferably 1 to 100 μm. The mirror support portions 35 may have a width W determined in consideration of structural resistance and the rotation of the mirror portion 34, and optionally selected from the range of, e.g., 1 to 50 μm.

For the material having a Young's modulus of up to 160 GPa, use may be made of the electrically conductive materials mentioned in connection with the aforesaid embodiments as well as the insulating materials referred to in the aforesaid embodiments. Such materials may be used alone or in a multilayer structure form comprising two or more. Even materials having a Young's modulus of greater than 160 GPa may be used in the event that in combination with the material(s) having a Young's modulus of up to 160 GPa, they provide a multilayer structure having a Young's modulus of up to 160 GPa.

It is here noted that the axial center of the mirror support portions 35 is in alignment with the center of the mirror portion 34 in the embodiment shown; however, if the axial center of the mirror support portions 35 is off the center of the mirror portion 34, it is then possible to improve the ability of the mirror portion to rotate a lot more.

It is also noted that when the light reflectance of the material used for the mirror portion 34 and the mirror support portions 35 is insufficient, the mirror portion 34 may as well have a reflective layer having a higher light reflectance. For such a reflective layer, the same materials as already mentioned may just as well be used.

The lower electrode 37, piezoelectric element 38 and upper electrode 39 constituting the drive portions 36 may be formed of the same material(s) as in the lower electrode 27, piezoelectric element 28 and upper electrode 29 constituting the aforesaid drive portions 26.

With such piezoelectric mirror device 31, for instance, the terminal 37b (lower electrode 37) side is at a GND potential, and as the desired ac voltage is applied to the upper electrode 39 via the terminal 39b, it enables the mirror portion 34 to displace at any desired resonant frequency. And the mirror support portions 35 are formed of the material having a Young's modulus of up to 160 GPa and the frame portion 32 includes the thinner portion 32a at a part of the site where there are the drive portions 36 positioned: the piezoelectric mirror device 31 is much larger in the amount of displacement of the mirror portion due to the piezoelectric element than conventional ones.

Figure 13:
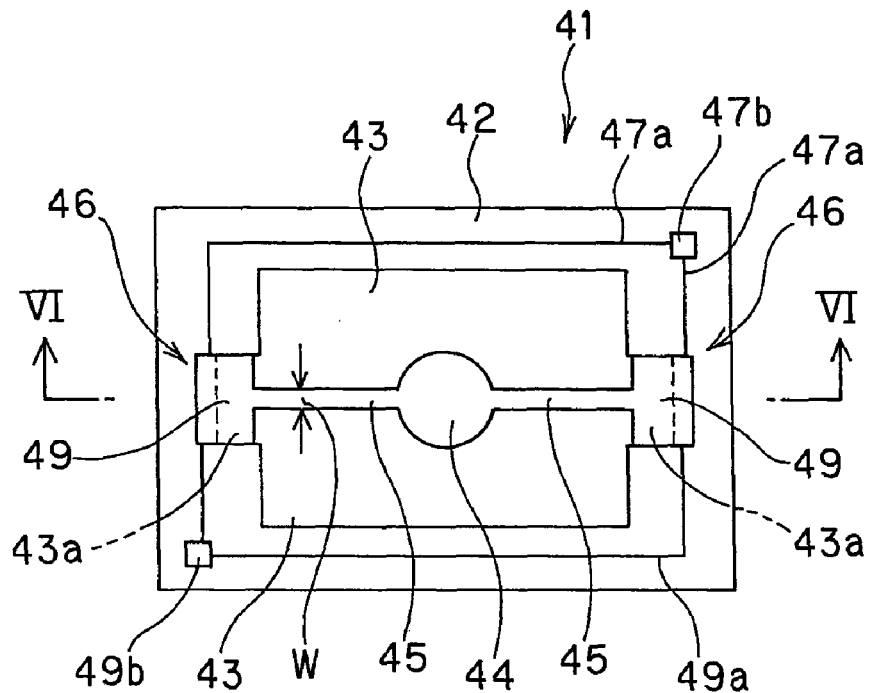
FIG. 13 is a plan view of a further embodiment of the inventive piezoelectric mirror device.
Figure 14:
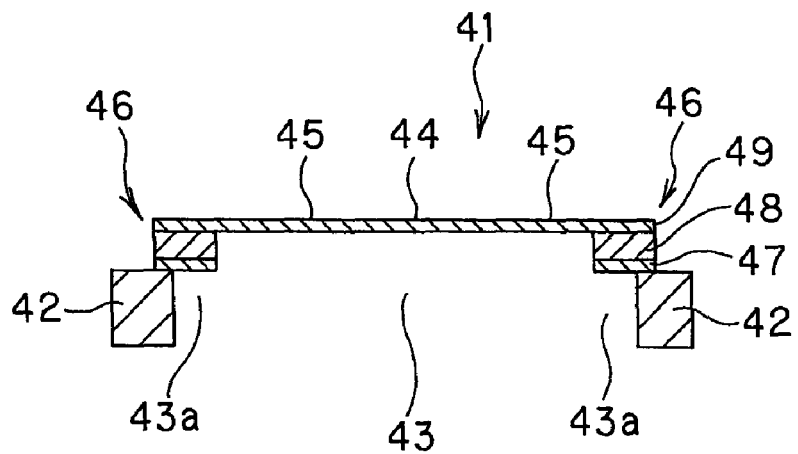
FIG. 14 is a sectional view of the piezoelectric mirror device shown in FIG. 13, as taken on arrowed line VI-VI.

(4) FIG. 13 is a plan view of a further embodiment of the inventive piezoelectric mirror device, and FIG. 14 is a sectional view of the piezoelectric mirror device shown in FIG. 13, as taken on arrowed line VI-VI. Referring to FIGS. 13 and 14, a piezoelectric mirror device 41 of the invention comprises a frame portion 42 having a centrally located opening 43, a mirror portion 44 positioned at the opening 43, a pair of mirror support portions 45 adapted to support the mirror portion 44 rotatably relative to the frame portion 42, and a pair of drive portions 46 that are a multilayer structure of a lower electrode 47, a piezoelectric element 48 and an upper electrode 49 and located at the frame portion 42. The aforesaid mirror support portions 45 are each made of a material having a Young's modulus of up to 160 GPa, preferably 30 to 150 GPa, and more preferably 60 to 130 GPa. The frame portion 42 includes a cutout 43a at a part of the site where there are the drive portions 46 positioned, and that cutout 43a is in contact with the opening 43. It is not preferable that the Young's modulus of the mirror support portions 45 exceeds 160 GPa, because the rigidity of the mirror support portions 45 grows high; so the amount of displacement of the mirror portion 44 due to the driving portions 46 grows small.

It is here noted that the lower electrode 47 is connected to a terminal 47b via a wire 47a, and that the upper electrode 49 is connected to a terminal 49b via a wire 49a.

The frame member 42 forming a part of the piezoelectric mirror device 41 is much the same as the frame portion 12 in the aforesaid embodiments, and the opening 43 and cutout 43a may be provided as is the case with the aforesaid opening 13 and cutout 13a.

In the piezoelectric mirror device 41, the mirror portion 44 and the mirror support portions 45 are formed integrally of a material having a Young's modulus of up to 160 GPa, preferably 30 to 150 GPa, and more preferably 60 to 130 GPa, and the mirror portion 44 may have any desired shape and area. The mirror support portions 45 are located such that they are coaxially opposite to each other with the mirror portion 44 interposed between them. Such mirror portion 44 and mirror support portions 45 levitate over the aforesaid opening 43; so to have structural resistance, they may have any desired thickness T selected from the range of at least 500 nm, and preferably 1 to 100 μm. The mirror support portions 45 may have a width W determined in consideration of structural resistance and the rotation of the mirror portion 44, and optionally selected from the range of, e.g., 1 to 50 μm.

For the material having a Young's modulus of up to 160 GPa, use may be made of the electrically conductive materials mentioned in connection with the aforesaid embodiments. Such materials may be used alone or in a multilayer structure form comprising two or more. Even materials having a Young's modulus of greater than 160 GPa may be used in the event that in combination with the material(s) having a Young's modulus of up to 160 GPa, they provide a multilayer structure having a Young's modulus of up to 160 GPa.

It is here noted that the axial center of the mirror support portions 45 is in alignment with the center of the mirror portion 44 in the embodiment shown; however, if the axial center of the mirror support portions 45 is off the center of the mirror portion 44, it is then possible to improve the ability of the mirror portion to rotate a lot more.

It is also noted that when the light reflectance of the material used for the mirror portion 44, the mirror support portions 45, and the upper electrode 49 is insufficient, the mirror portion 44 may as well have a reflective layer having a higher light reflectance. For such a reflective layer, the same materials as already mentioned may just as well be used.

The lower electrode 47, and the piezoelectric element 48 constituting the drive portions 46 may be formed of the same material(s) as in the lower electrode 17 and the piezoelectric element 18 constituting the aforesaid drive portions 16 in the aforesaid embodiment.

Figure 15:
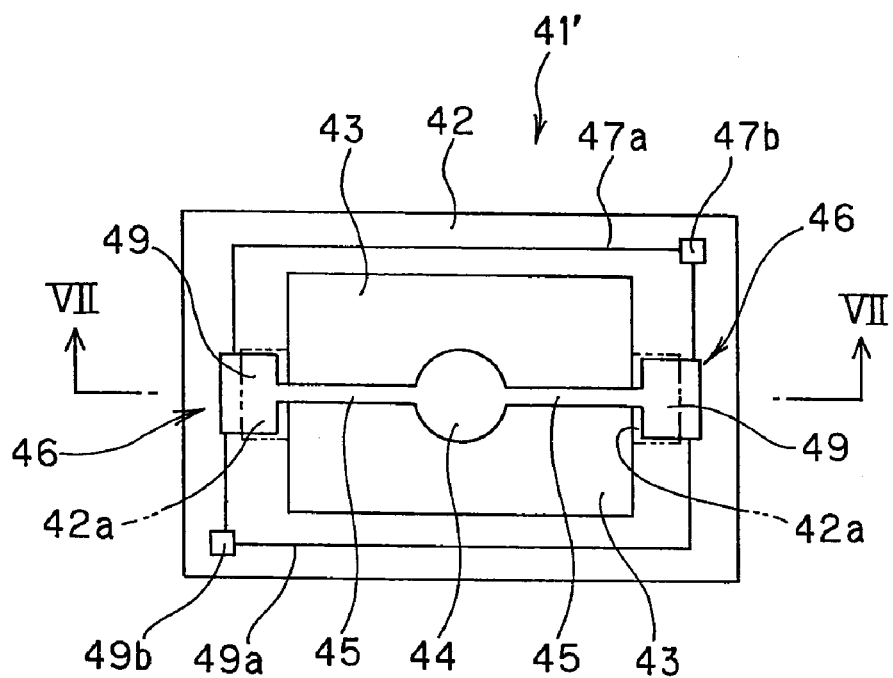
FIG. 15 is a plan view of a further embodiment of the inventive piezoelectric mirror device.
Figure 16:
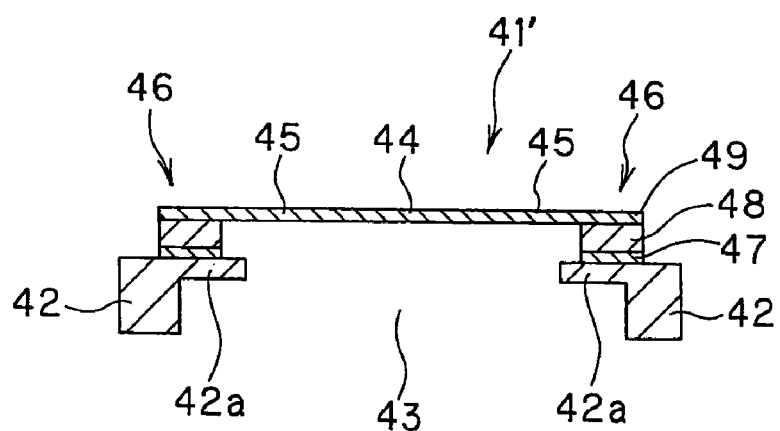
FIG. 16 is a sectional view of the piezoelectric mirror device shown in FIG. 15, as taken on arrowed line VII-VII.

FIG. 15 is a plan view of a further embodiment of the inventive piezoelectric mirror device, and FIG. 16 is a sectional view of the piezoelectric mirror device shown in FIG. 15, as taken on arrowed line VII-VII. Referring to FIGS. 15 and 16, a piezoelectric mirror device 41' of the invention is the same as the aforesaid piezoelectric mirror device 41 with the exception that of the frame portion 42, a part of the site where there are the drive portions 46 positioned includes a thinner portion 42a instead of the cutout 43a, and that thinner portion 42a is in contact with the opening 43. Therefore, like parts are indicated by like numerals; so their explanations are left out.

There is no special limitation on the configuration and size of that thinner portion 42a provided that there is no interference with the displacement of the mirror support portions 45 and the mirror portion 44 due to the deformation of the drive portions 46. In the embodiment shown, the thinner portion 42a is configured such that it is positioned substantially under and all over the drive portions 46. The thinner portion 42a may have any desired thickness optionally selected from the range of e.g., up to 50 μm, and preferably 1 to 30 μm.

With such piezoelectric mirror device 41, 41', for instance, the terminal 47b (lower electrode 47) side is at a GND potential, and as the desired ac voltage is applied to the upper electrode 49 via the terminal 49b, it enables the mirror portion 44 to displace at any desired resonant frequency. And the mirror support portions 45 are formed of the material having a Young's modulus of up to 160 GPa and the frame portion 42 includes the cutout 43a or thinner portion 42a at a part of the site where there are the drive portions 46 positioned: the piezoelectric mirror device 41, 41' is much larger in the amount of displacement of the mirror portion due to the piezoelectric element than conventional ones.

Figure 17:
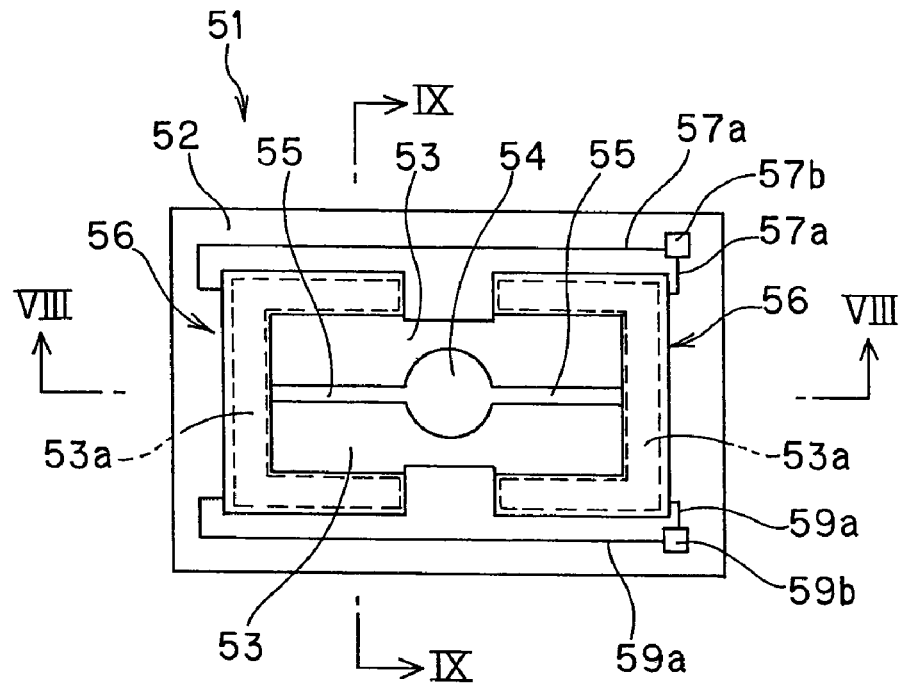
FIG. 17 is a plan view of a further embodiment of the inventive piezoelectric mirror device.
Figure 18A:
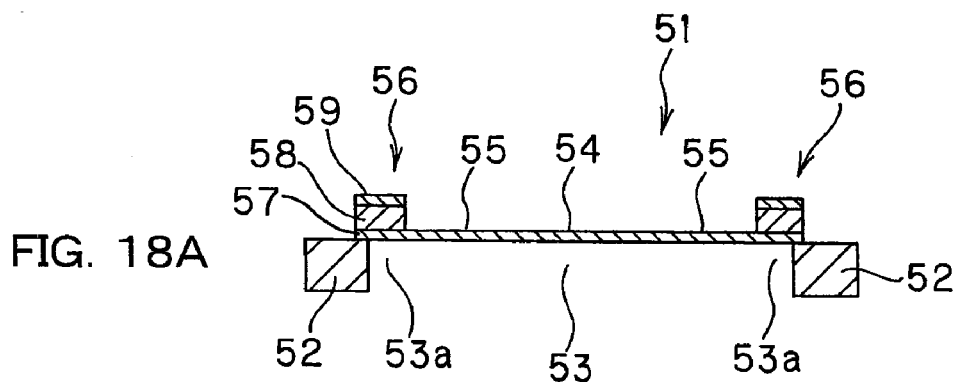
FIG. 18A is a sectional view as taken on arrowed line VIII-VIII.
Figure 18B:
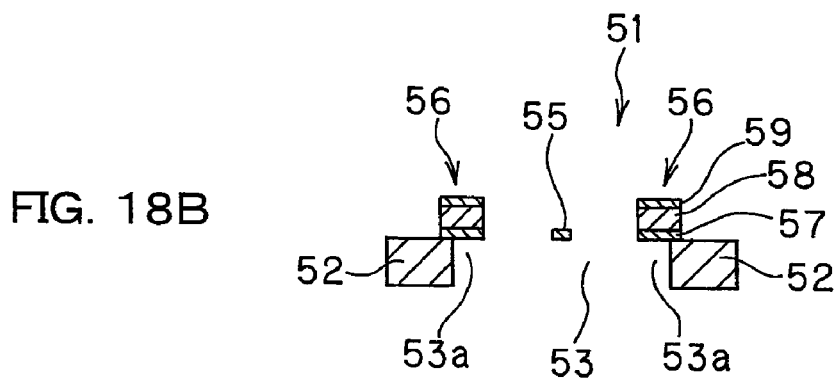
FIG. 18B is a sectional view as taken on arrowed line IX-IX.

(5) FIG. 17 is a plan view of a further embodiment of the inventive piezoelectric mirror device, and FIG. 18A is a sectional view of the piezoelectric mirror device shown in FIG. 17, as taken on arrowed line VIII-VIII while FIG. 18B is a sectional view of the piezoelectric mirror device shown in FIG. 17, as taken on arrowed line IX-IX. Referring to FIGS. 17, 18A and 18B, a piezoelectric mirror device 51 of the invention comprises a frame portion 52 having a centrally located opening 53, a mirror portion 54 positioned at the opening 53, a pair of mirror support portions 55 adapted to support the mirror portion 54 rotatably relative to the frame portion 52, and a pair of drive portions 56 that are a multilayer structure of a lower electrode 57, a piezoelectric element 58 and an upper electrode 59 and located at the frame portion 52. And the mirror support portions 55 are each made of a material having a Young's modulus of up to 160 GPa, preferably 30 to 150 GPa, and more preferably 60 to 130 GPa. The frame portion 52 includes a cutout 53a at a part of the site where there are the drive portions 56 positioned, and that cutout 53a is in contact with the opening 53. It is not preferable that the Young's modulus of the mirror support portions 55 exceeds 160 GPa, because the rigidity of the mirror support portions 55 grows high; so the amount of displacement of the mirror portion 54 due to the driving portions 56 grows small.

It is here noted that the lower electrode 57 is connected to a terminal 57b via a wire 57a, and that the upper electrode 59 is connected to a terminal 59b via a wire 59a.

Such piezoelectric mirror device 51 is much the same as the aforesaid piezoelectric mirror device 11 with the exception that the shape of the cutout 53a that the frame portion 52 has and the shape of the drive portions 56 are different. That is, the piezoelectric mirror device 51 has a pair of C-shaped drive portions 56 located in such a way as to surround the opening 53, and the cutout 53a, too, is in a C-shaped configuration (surrounded with a chain line in FIG. 17).

Figure 19:
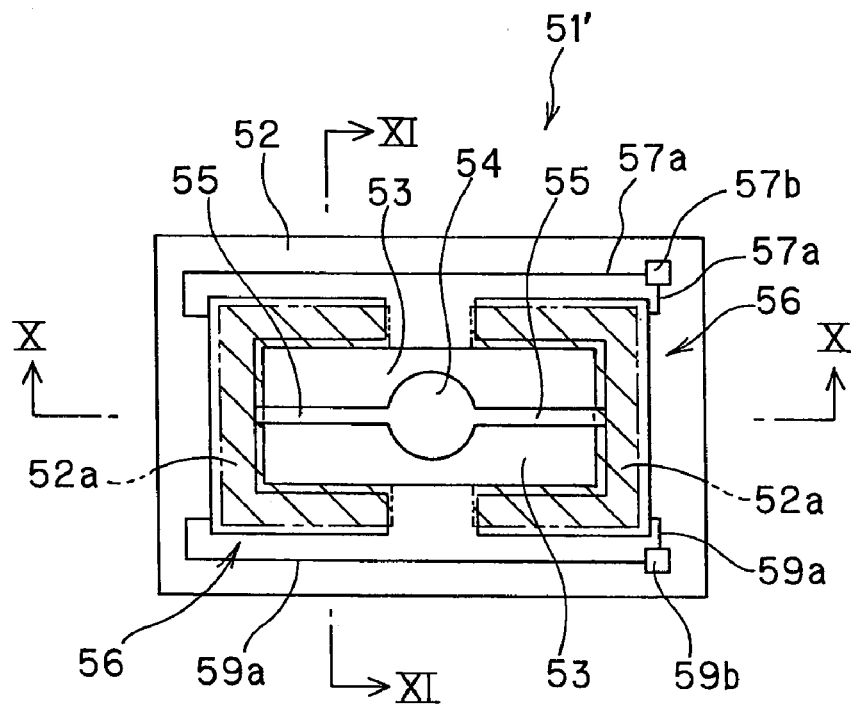
FIG. 19 is a plan view of a further embodiment of the inventive piezoelectric mirror device.
Figure 20A:
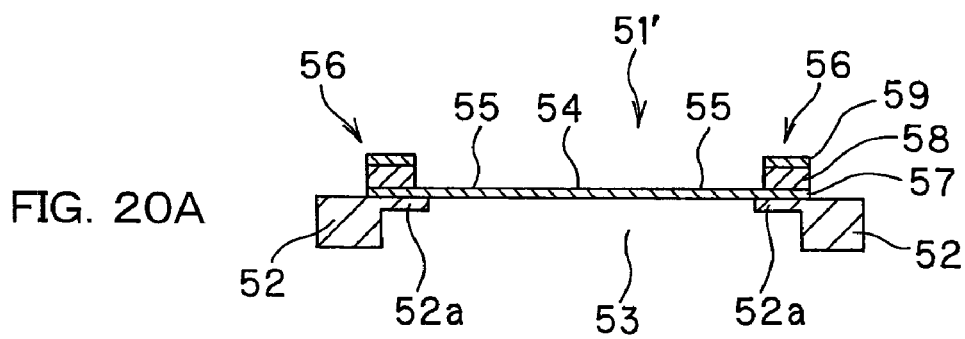
FIG. 20A is a sectional view as taken on arrowed line X-X.
Figure 20B:
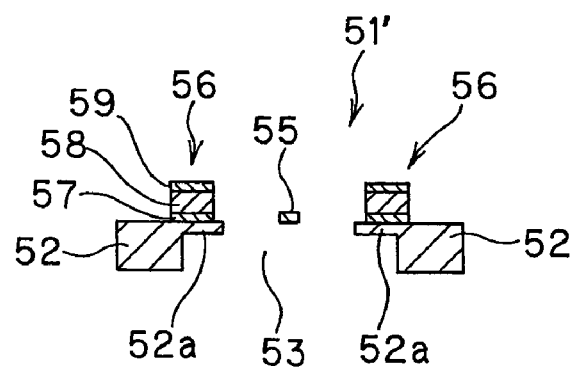
FIG. 20B is a sectional view as taken on arrowed line XI-XI.

FIG. 19 is a plan view of a further embodiment of the inventive piezoelectric mirror device, and FIG. 20A is a sectional view of the piezoelectric mirror device shown in FIG. 19, as taken on arrowed line X-X while FIG. 20B is a sectional view of the piezoelectric mirror device shown in FIG. 19, as taken on arrowed line XI-XI. Referring to FIGS. 19, 20A and 20B, a piezoelectric mirror device 51' of the invention is much the same as the aforesaid piezo-electric mirror device 51 with the exception that the frame portion 52 includes, at a part of the site where there are the drive portions positioned, a thinner portion 52a in place of the cutout 53a, and that thinner portion 52a is in contact with the opening 53. Therefore, like parts are indicated by light references; so their explanations are left out.

The thinner portion 52a that the frame 52 has is configured such that it is positioned almost under and all over the drive portions 56, as hatched in FIG. 19. The thinner portion 52a may have any desired thickness optionally selected from the range of e.g., up to 50 μm, preferably 1 to 30 μm.

With such piezoelectric mirror device 51, 51', for instance, the terminal 57b (lower electrode 57) side is at a GND potential, and as the desired ac voltage is applied to the upper electrode 59 via the terminal 59b, it enables the mirror portion 54 to displace at any desired resonant frequency. And the mirror support portions 55 are formed of the material having a Young's modulus of up to 160 GPa and the frame portion 52 includes the cutout 53a or thinner portion 52a at a part of the site where there are the drive portions 56 positioned: the piezoelectric mirror device 51, 51' is much larger in the amount of displacement of the mirror portion due to the piezoelectric element than conventional ones.

It is here noted that in the aforesaid piezoelectric mirror device 21, 21', 31, 41, 41', too, the drive portions may as well be C-shaped, and the cutout or thinner portion may as well be C-shaped, but of course, they may have other configurations.

Figure 21:
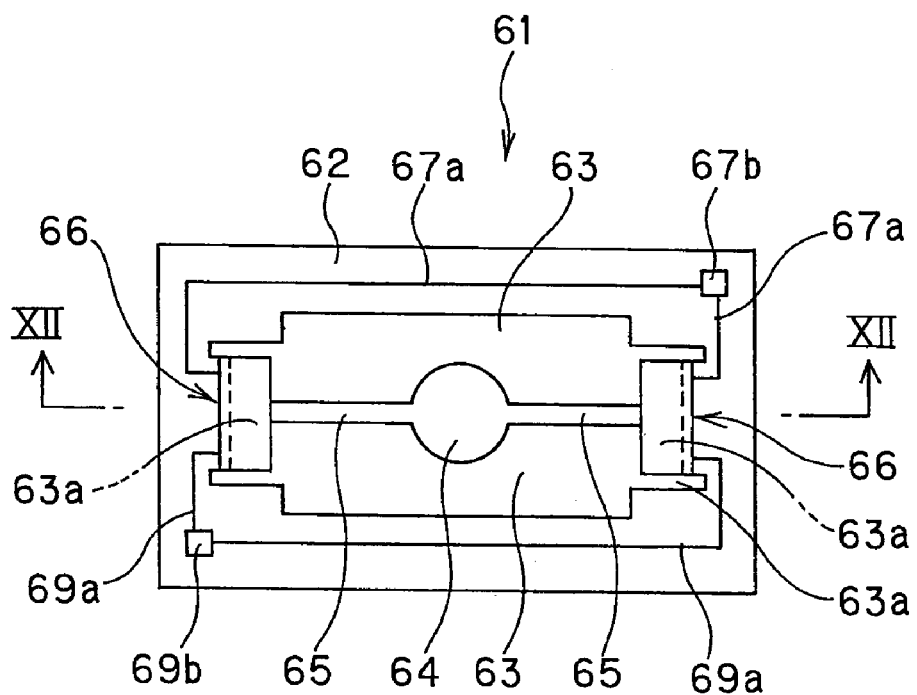
FIG. 21 is a plan view of a further embodiment of the inventive piezoelectric mirror device.
Figure 22:
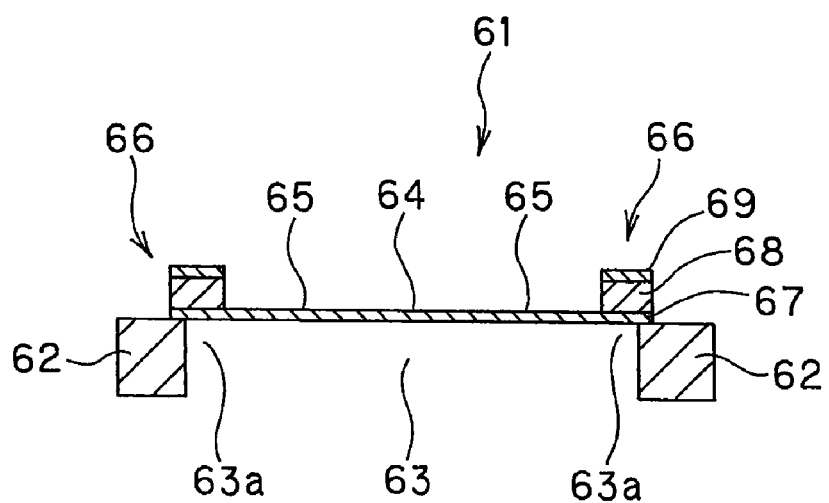
FIG. 22 is a sectional view of the piezoelectric mirror device shown in FIG. 21, as taken on arrowed line XII-XII.

(6) FIG. 21 is a plan view of a further embodiment of the inventive piezoelectric mirror device, and FIG. 22 is a sectional view of the piezoelectric mirror device shown in FIG. 21, as taken on arrowed line XII-XII. Referring to FIGS. 21 and 22, a piezoelectric mirror device 61 of the invention comprises a frame portion 62 having a centrally located opening 63, a mirror portion 64 positioned at the opening 63, a pair of mirror support portions 65 adapted to support the mirror portion 64 rotatably relative to the frame portion 62, and a pair of drive portions 66 that are a multilayer structure of a lower electrode 67, a piezoelectric element 68 and an upper electrode 69 and located at the frame portion 62. And the mirror support portions 65 are each made of a material having a Young's modulus of up to 160 GPa, preferably 30 to 150 GPa, and more preferably 60 to 130 GPa. The frame portion 62 includes a cutout 63a at a part of the site where there are the drive portions 66 positioned, and that cutout 63a is in contact with the opening 63. It is not preferable that the Young's modulus of the mirror support portions 65 exceeds 160 GPa, because the rigidity of the mirror support portions 65 grows high; so the amount of displacement of the mirror portion 64 due to the driving portions 66 grows small.

It is here noted that the lower electrode 67 is connected to a terminal 67b via a wire 67a, and that the upper electrode 69 is connected to a terminal 69b via a wire 69a.

Such piezoelectric mirror device 61 is much the same as the aforesaid piezoelectric mirror device 11 with the exception that the shape of the cutout 63a that the frame portion 62 has, and the shape of the drive portions 66 is different. That is, the piezoelectric mirror device 61 has a pair of drive portions 66 located in such a way as to extend in the opening 63 so that the displacement of the mirror portion 64 due to the operation of the drive portions 66 can take place more efficiently.

Figure 23:
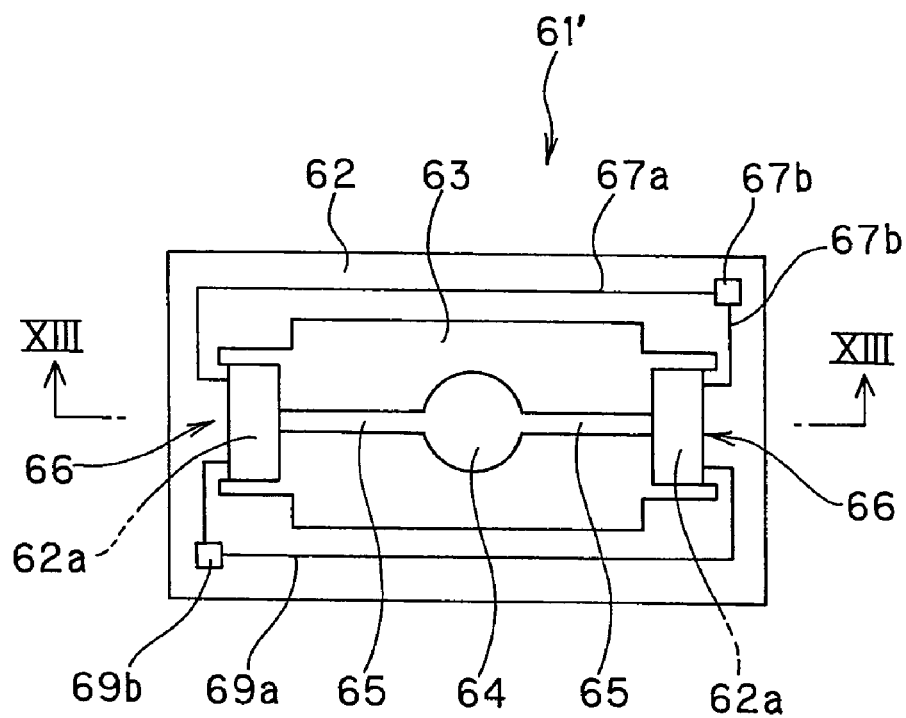
FIG. 23 is a plan view of a further embodiment of the inventive piezoelectric mirror device.
Figure 24:
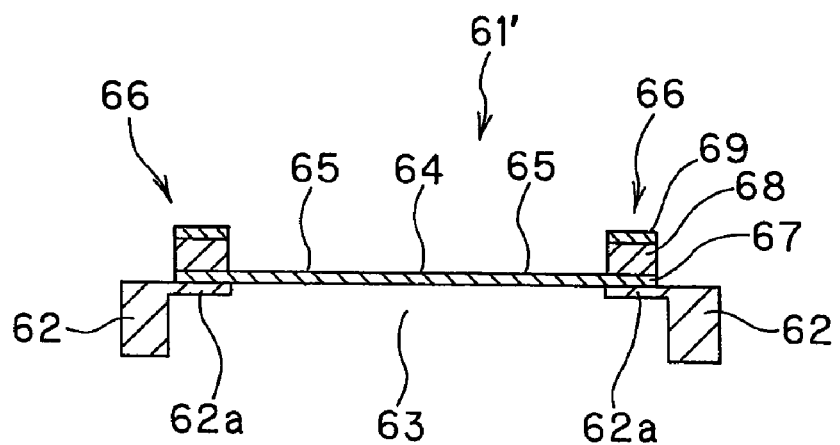
FIG. 24 is a sectional view of the piezoelectric mirror device shown in FIG. 23, as taken on arrowed line XIII-XIII.

FIG. 23 is a plan view of a further embodiment of the inventive piezoelectric mirror device, and FIG. 24 is a sectional view of the piezoelectric mirror device shown in FIG. 23, as taken on arrowed line XIII-XIII. Referring to FIGS. 23 and 24, a piezoelectric mirror device 61' of the invention is much the same as the aforesaid piezo-electric mirror device 61 with the exception that the frame portion 62 includes, at a part of the site where there are the drive portions 66 positioned, a thinner portion 62a in place of the cutout 63a, and that thinner portion 62a is in contact with the opening 63. Therefore, like parts are indicated by light references; so their explanations are left out.

The thinner portion 62a that the frame 62 has is configured such that it is positioned almost under and all over the drive portions 66. The thinner portion 62a may have any desired thickness optionally selected from the range of e.g., up to 50 µm, preferably 1 to 30 µm.

With such piezoelectric mirror device 61, 61', for instance, the terminal 67b (lower electrode 67) side is at a GND potential, and as the desired ac voltage is applied to the upper electrode 69 via the terminal 69b, it enables the mirror portion 64 to displace at any desired resonant frequency. And the mirror support portions 65 are formed of the material having a Young's modulus of up to 160 GPa and the frame portion 62 includes the cutout 63a or thinner portion 62a at a part of the site where there are the drive portions 66 positioned: the piezoelectric mirror device 61, 61' is much larger in the amount of displacement of the mirror portion by the piezoelectric element than conventional ones.

It is here noted that in the aforesaid piezoelectric mirror device 21, 21', 31, 41, 41', too, the cutout or thinner portion of the frame portion may as well be formed such that the drive portions extend into the opening.

Figure 25:
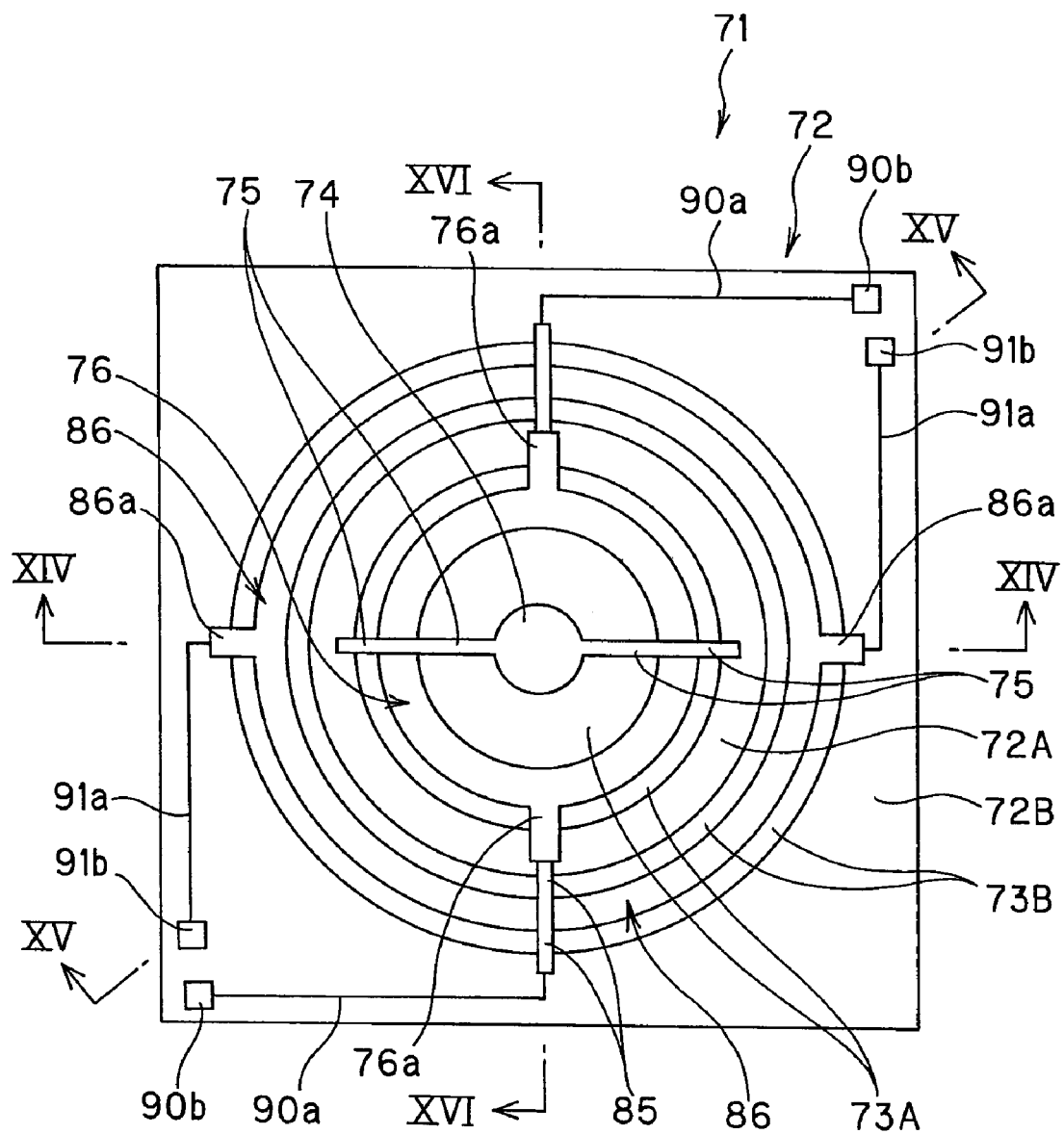
FIG. 25 is a plan view of a further embodiment of the inventive piezoelectric mirror device.
Figure 26A:
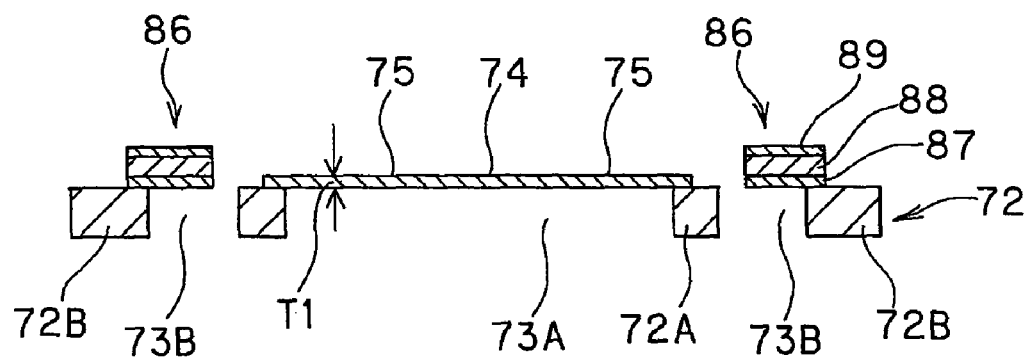
FIG. 26A is a sectional view as taken on arrowed line XIV-XIV.
Figure 26B:
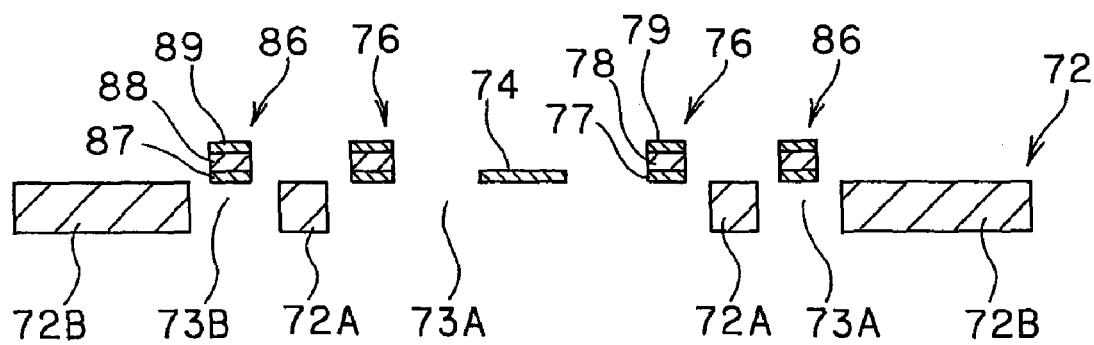
FIG. 26B is a sectional view as taken on arrowed line XV-XV.
Figure 26C:
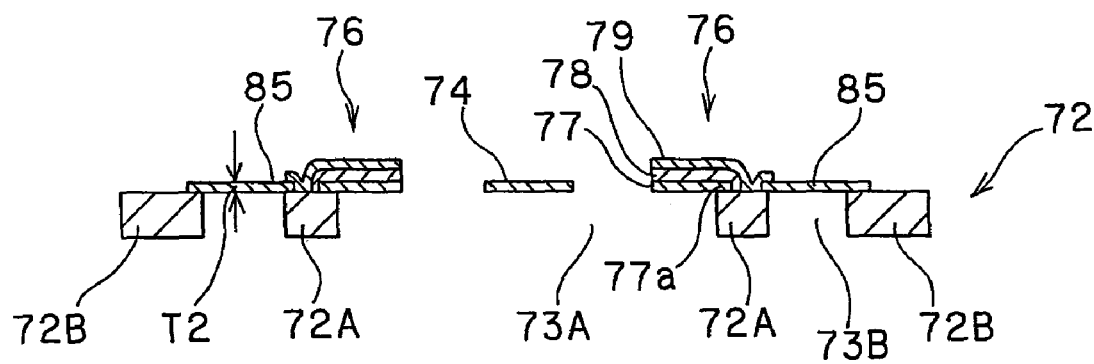
FIG. 26C is a sectional view as taken on arrowed line XVI-XVI.

(7) FIG. 25 is a plan view of a further embodiment of the inventive piezoelectric mirror device; FIG. 26A is a sectional view of the piezoelectric mirror device shown in FIG. 25, as taken on arrowed line XIV-XIV; FIG. 26B is a sectional view of that, as taken on arrowed line XV-XV; and FIG. 26C is a sectional view of that, as taken on arrowed line XVI-XVI. Referring to FIGS. 25, 26A, 26B and 26C, a piezoelectric mirror device 71 of the invention is of the biaxial type that comprises a frame portion 72 made up of an annular form of inner frame portion 72A having a centrally located inner opening 73A of round shape and an outer frame portion 72B positioned outside the inner frame portion 72A with an annular form of outer opening 73B interposed between them, a mirror portion 74 positioned at the inner opening 73A, a pair of X-axis mirror support portions 75 adapted to support the mirror portion 74 rotatably relative to the inner frame portion 72A, and a pair of X-axis drive portions 76 that are a multilayer structure of a lower electrode 77, a piezoelectric element 78 and an upper electrode 79 and positioned in the inner opening 73A. The X-axis mirror supports 75 are formed integrally with the lower electrode 77 constituting a part of X-axis drive portions 76, and a pair of X-axis drive portions 76 in a semi-annular form are opposite to each other with the X-axis mirror support portions 75 interposed between them. Across and over the outer opening 73B there are a pair of Y-axis mirror support portions 85 provided that are adapted to support the inner frame portion 72A rotatably relative to the outer frame portion 72B, and at the outer opening 73B there are a pair of Y-axis drive portions 86 positioned that are a multilayer structure of a lower electrode 87, a piezoelectric element 88 and an upper electrode 89. The Y-axis mirror support portions 85 are formed integrally with the lower electrode 87 constituting a part of Y-axis drive portions 86, and a pair of Y-axis drive portions 86 in a semi-annular form are opposite to each other with the Y-axis mirror support portions 85 interposed between them. And the X-axis drive portions 76a extend from a pair of semi-annular X-axis drive portions 76 to the inner frame portion 72A in a direction coaxial to the Y-axis mirror support portions 85, and the Y-axis drive portions 86a extend from a pair of semi-annular Y-axis drive portions 86 to the outer frame portion 72B in a direction coaxial to the X-axis mirror support portions 75. It is here noted that the axial direction of the X-axis mirror support portions 75 is set at an angle of 90° with the axial direction of the Y-axis mirror support portions 85.

And in the invention, the X-axis mirror support portions 75, and the Y-axis mirror support portions 85 are each made of a material having a Young's modulus of up to 160 GPa, preferably 30 to 150 GPa, and more preferably 60 to 130 GPa. It is not preferable that the Young's modulus of the X-axis mirror support portions 75, and the Y-axis mirror support portions 85 exceeds 160 GPa, because the rigidity of the respective mirror support portions grows high; so the amount of displacement of the mirror portion 74 due to the X-axis drive portions 76 and the Y-axis drive portions 86 grows small.

Figure 27:
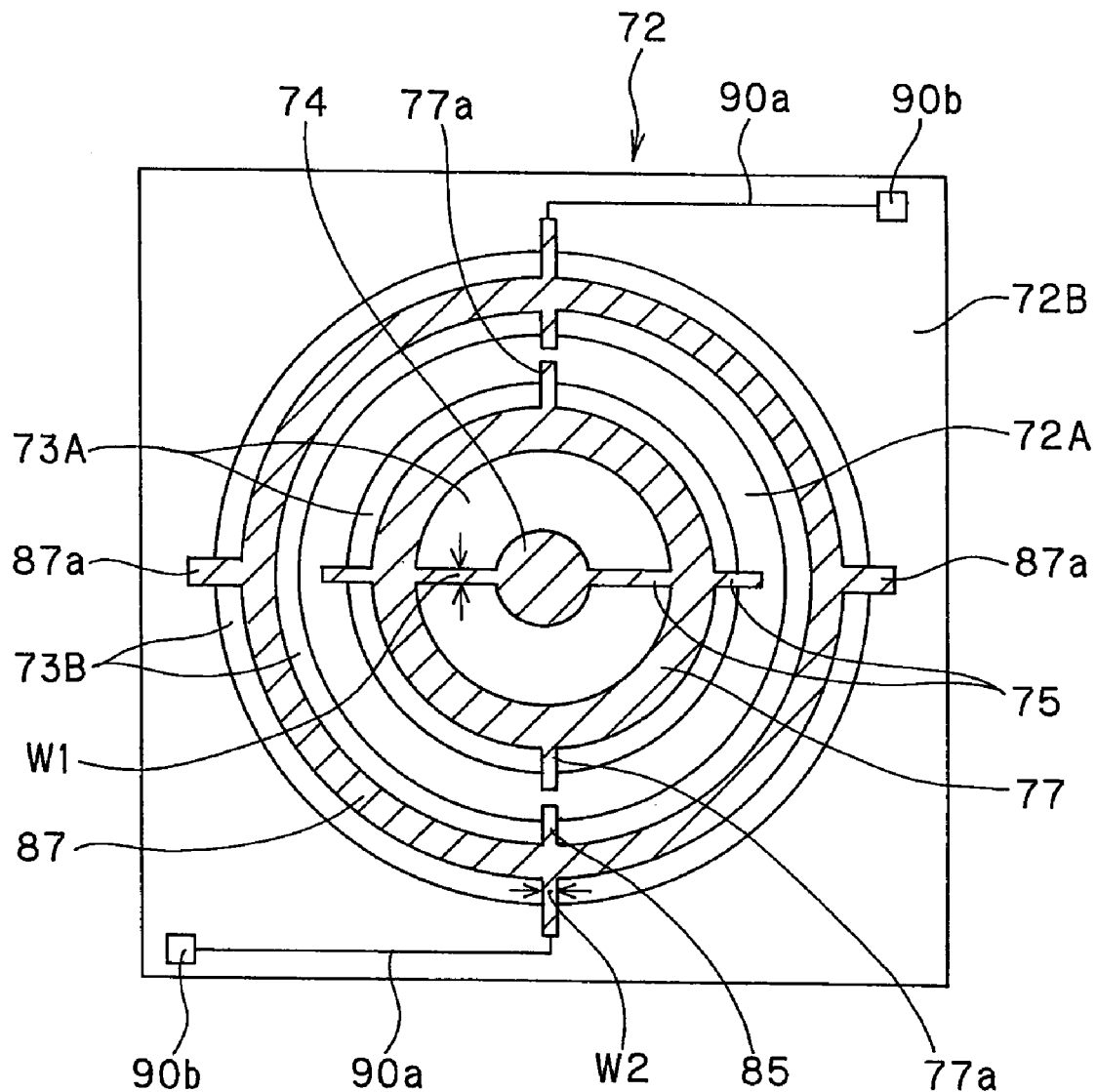
FIG. 27 is illustrative of the lower electrodes of the piezoelectric mirror device shown in FIG. 25.
Figure 28:
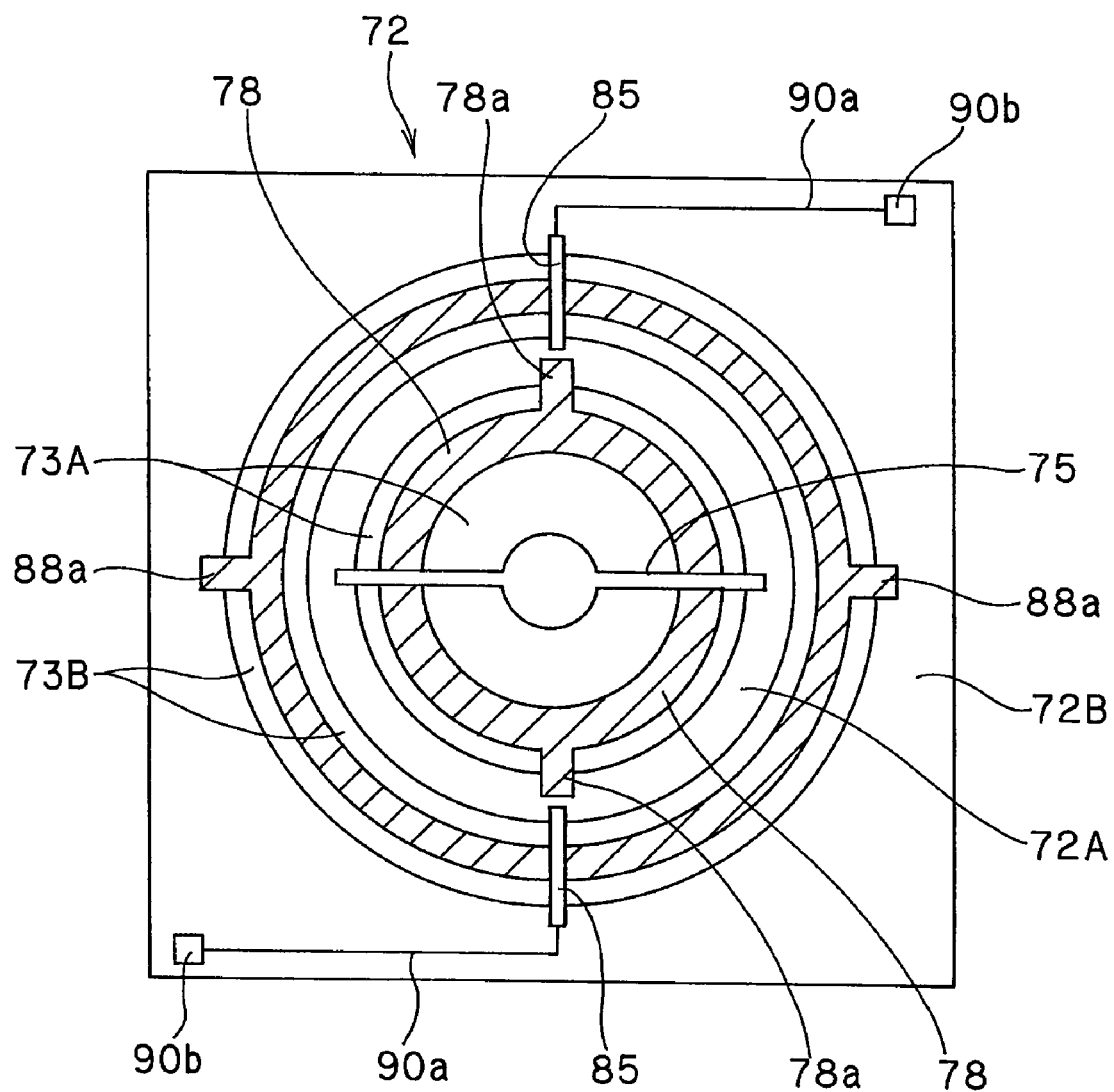
FIG. 28 is illustrative of the piezoelectric element of the piezoelectric mirror device shown in FIG. 25.
Figure 29A:
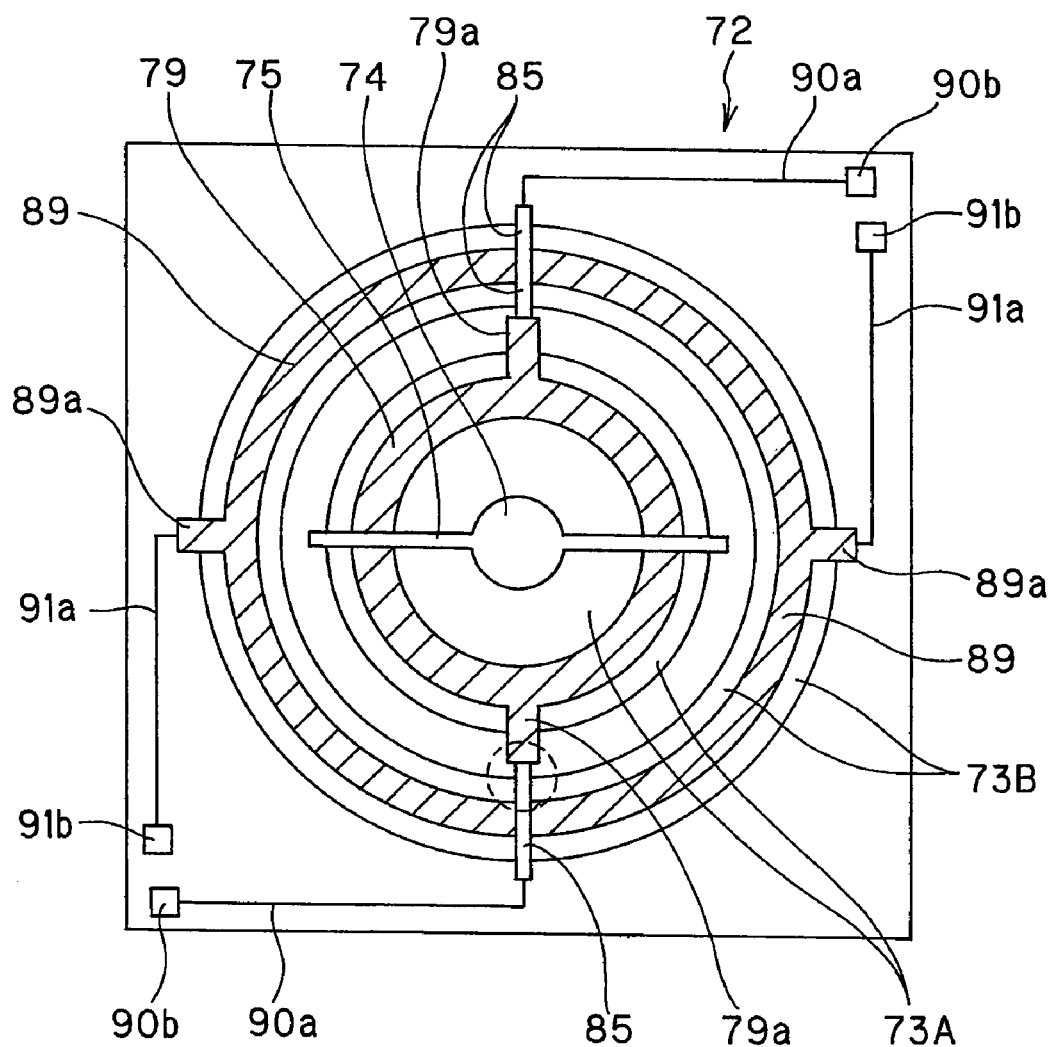
FIG. 29A is a plan view.
Figure 29B:
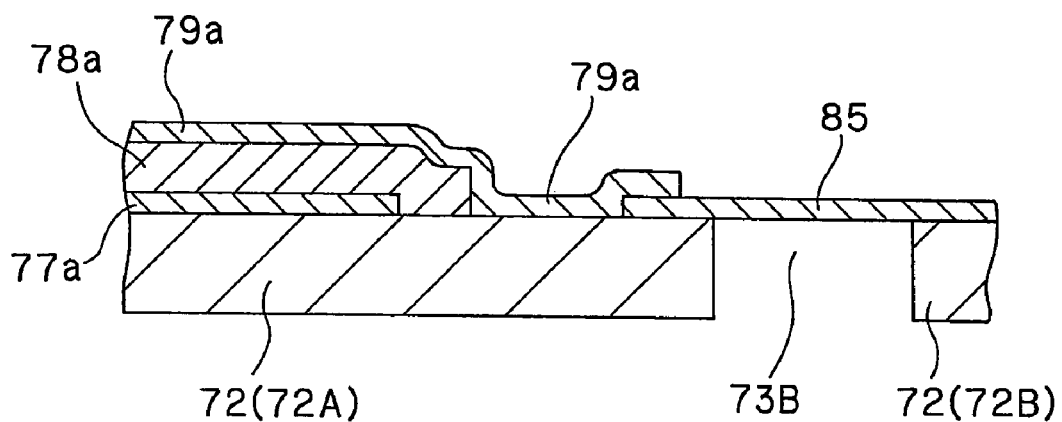
FIG. 29B is an enlarged sectional view of a site surrounded by a chain line in FIG. 29A.

The aforesaid piezoelectric mirror device 71 is now explained in further details with reference to FIGS. 27, 28 and 29. FIG. 27 illustrates the piezoelectric mirror device 71 of FIG. 25, where the upper electrodes 79, 89 and the piezoelectric elements 78, 88 are removed to expose to view the lower electrodes 77, 87, the X-mirror support portions 75 and the Y-axis mirror support portions 85, with the mirror portion 74, the X-axis support portions 75, the lower electrodes 77, 87 and the Y-axis mirror support portions 85 indicated by hatches; FIG. 28 illustrates the piezoelectric mirror device 71 of FIG. 25, where the upper electrodes 79, 89 are removed to expose the piezoelectric elements 78, 88 to view, with the piezoelectric elements 78, 88 indicated by hatches; FIG. 29A illustrates the piezoelectric mirror device 71 of FIG. 25 where the upper electrodes 79, 89 are indicated by hatches; and FIG. 29B is an enlarged, sectional view of a site encircled with a chain line in FIG. 29A.

As shown in FIG. 27, the annular form of lower electrode 77 is positioned in the inner opening 73A, and the annular form of lower electrode 87 is positioned in the outer opening 73B. Inside the lower electrode 77 there is the mirror portion 74 positioned, and a pair of X-axis mirror supports 75 are located oppositely and coaxially with the mirror portion 74 positioned between them for connection to the lower electrode 87. And the X-axis mirror support portions 75 extend beyond the annular lower electrode 77, and have their ends locked to the inner frame portion 72A; the Y-axis mirror support portions 85 extend oppositely and coaxially from the annular lower electrode 87 and have their ends locked to the inner and outer frame portions 72A and 72B; and the lower electrode 77a extends from the annular lower electrode 77 to the inner frame portion 72A in such a way as to be coaxial to the Y-axis mirror support portions 85. On the other hand, the lower electrode 87a extends from the annular lower electrode 87 to the outer frame portion 72B in coaxial relation to the X-axis mirror support portions 75. Thus, the lower electrodes 77, 77a, the lower electrodes 87, 87a, mirror portion 74, the X-axis mirror support portions 75 and the Y-axis mirror support portions 85 are integrally formed of an electrically conductive material having a Young's modulus of up to 160 GPa, preferably 30 to 150 GPa, and more preferably 60 to 130 GPa.

For the electrically conductive material having a Young's modulus of up to 160 GPa, use may be made of those mentioned in connection with the aforesaid embodiments. Such materials may be used alone or in a multilayer structure form comprising two or more. Even materials having a Young's modulus of greater than 160 GPa may be used in the event that in combination with the material(s) having a Young's modulus of up to 160 GPa, they provide a multilayer structure having a Young's modulus of up to 160 GPa. It is here noted that when the light reflectance of the material used is insufficient, the mirror portion 74 may as well have a reflective layer having a higher light reflectance. For such a reflective layer, the same materials as already mentioned may just as well be used.

Supporting the mirror portion 74, the X-axis mirror support portions 75 must have structural resistance, and supporting the inner frame portion 72A, the Y-axis mirror support portions 85 must have structural resistance. In other words, the X-axis mirror support portions 75 must have a thickness T1 (see FIG. 26A) selected from the range of at least 500 nm, preferably 1 to 100 μm, and the Y-axis mirror support portions 85 must have a thickness T2 (see FIG. 26C) selected from the range of at least 500 nm, preferably 1 to 100 μm. The width W1 of the X-axis mirror support portions 75, and the width W2 of the Y-axis mirror support portions 85 (see FIG. 27) may optionally be determined in consideration of the ability of the mirror portion 74 or the inner frame portion 72A to rotate as well as their structural resistance.

It is here noted that a pair of Y-axis mirror support portions 85 in conduction to the lower electrode 87 as already mentioned are each connected to a terminal 90b via a wire 90a.

As shown in FIG. 28, there are a pair of semi-annular piezoelectric elements 78 located on the lower electrode 77, with the X-axis mirror support portions 75 interposed between them, and the piezoelectric element 78a is formed in such a way as to cover the lower electrode 77a from that piezoelectric element 78. On the other hand, a pair of semi-annular piezoelectric elements 88 are located on the lower electrode 87 in such a way as to be opposite to each other with the Y-axis mirror support portions 85 sandwiched between them. Likewise, the piezoelectric element 88a is formed in such a way as to cover the lower electrode 87a from that piezoelectric element 88. Such piezoelectric elements 78, 88 may each be formed of conventionally known piezoelectric materials such as lead titanate zirconate (PZT), barium titanate (BTO), lead titanate (PTO), lithium niobate ($LiNbO_3$), lithium tantalate ($LiTaO_3$), and lithium tetraborate ($Li_2B_4O_7$). The piezoelectric elements 78, 88 may each have any desired thickness optionally selected the range of, e.g., 5 to 100 μm.

Further, as shown in FIG. 29A, the upper electrodes 79, 79a, 89, 89a are located in such a way as to cover the piezoelectric elements 78, 78a, 88, 88a, and the upper electrode 79a that covers the piezoelectric element 78a extends to a position where a part of the Y-axis mirror support portions 85 locked to the inner frame portion 72A is covered with it, as shown in FIG. 29B. This makes conduction between the Y-axis mirror support portions 85 (lower electrode 77) and the upper electrode 79. Such upper electrodes 79, 79a, 89, 89a may be formed of Pt, Au, Ag, Pd, Cu, Sn and so on alone or in combination of two or more. It may also be formed of a multilayer structure comprising an underlay metal layer of Cr, Ti, Mo, Ta or the like and a surface layer formed of the aforesaid metal(s) and located on the underlay metal layer. Such upper electrodes may have any desired thickness optionally selected from the range of, e.g., 300 nm to 5 μm.

It is noted that the upper electrode 89a is connected to a terminal 91b via a wire 91a.

With such piezoelectric mirror device 71 of the biaxial type, for instance, the lower electrode 77 is at a GND potential, and as the desired ac voltage is applied from the terminal 90b to the upper electrode 79 via the Y-axis mirror support portions 85 and the upper electrode 79a, it enables the X-axis drive portions 76 to be driven at any desired resonant frequency thereby displacing the mirror portion 74. The lower electrode 87 is at a GND potential, on the other hand, and as the desired ac voltage is applied from the terminal 91b to the upper electrode 89 via the upper electrode 89a, it enables the Y-axis drive portions 86 to be driven at any desired resonant frequency thereby displacing the inner frame portion 72A. And the X-axis mirror support portions 75 and the Y-axis mirror support portions 85 are formed of the material having a Young's modulus of up to 160 GPa and the X- and Y-axis drive portions 76 and 86 are positioned at the openings (cutouts) 73A and 73B: the biaxial type piezoelectric mirror device here is much larger in the amount of displacement of the mirror portion due to the piezoelectric elements than conventional ones.

The aforesaid piezoelectric mirror device embodiments are provided for the purpose of illustration only; the inventive piezoelectric mirror device is never limited to them.

[Piezoelectric Mirror Device Fabrication Process]

The fabrication process for the inventive piezoelectric mirror device is now explained.

(1) FIGS. 30A to 30E and FIGS. 31A to 31C are step diagrams illustrative of one embodiment of the inventive fabrication process wherein the piezoelectric mirror device 11, 11' shown in FIGS. 1 to 6 is taken as an example.

Figure 30A:
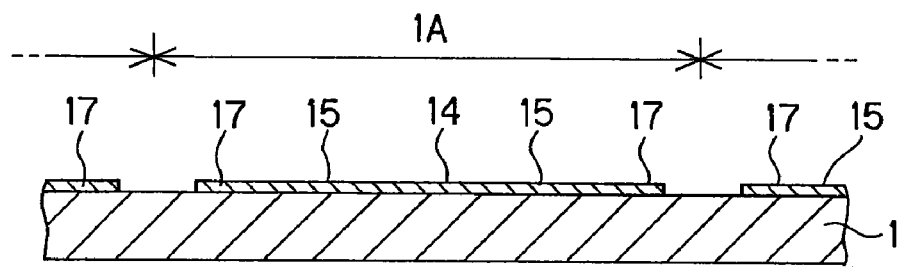
FIGS. 30A to 30E are step diagrams illustrative of one embodiment of the piezoelectric mirror device fabrication process according to the invention.
Figure 30B:
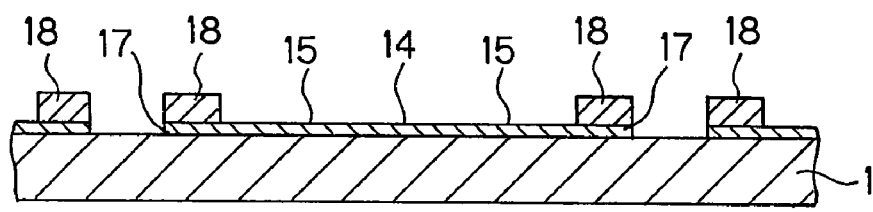
Figure 31A:
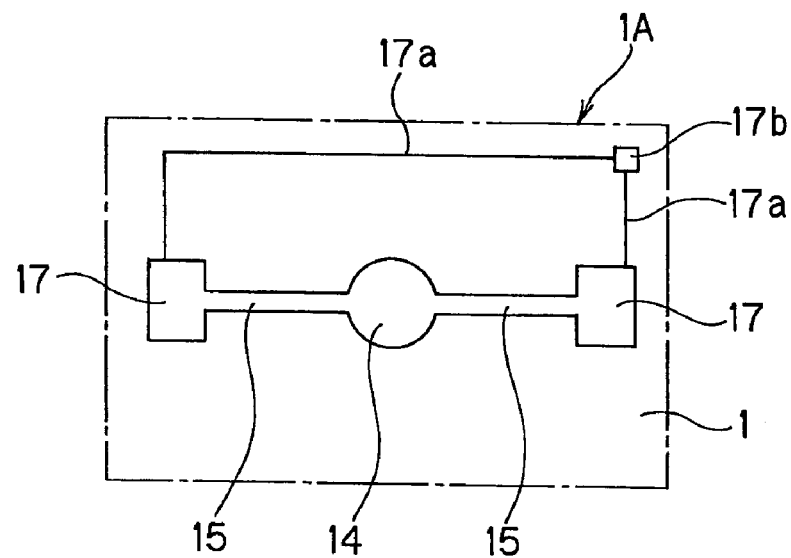
FIGS. 31A to 31C are step diagrams illustrative of one embodiment of the piezoelectric mirror device fabrication process according to the invention.
Figure 31B:
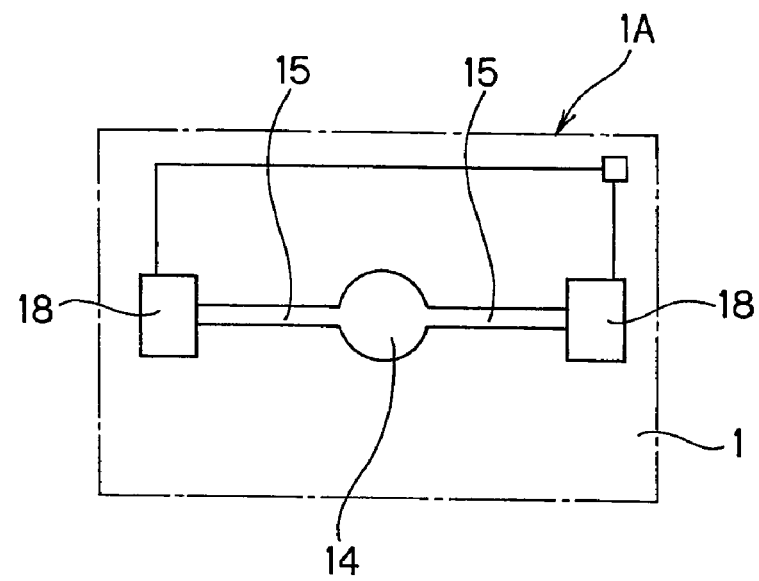

First of all, a silicon wafer 1 is divided into a multiplicity of segments (1A in FIG. 30A), and on one surface of the silicon wafer 1 per segment, a pair of lower electrodes 17, a mirror portion 14 positioned between the lower electrodes 17, and a pair of mirror support portions 15 adapted to join the mirror portion 14 to the lower electrodes 17 are formed of the electrically conductive material having a Young's modulus of up to 160 GPa (FIGS. 30A and 31A). The electrically conductive material having a Young's modulus of up to 160 GPa, for instance, includes Al (70.3 GPa), Au (78.0 GPa), Ag (82.7 GPa), Cu (130 GPa), Zn (108.0 GPa), and Ti (115.7 GPa). To prevent the mirror portion 14, the mirror support portions 15 and the lower electrode 17 from melting during sintering for the formation of the piezoelectric element 18 at a later step, the electrically conductive material whose melting point is higher than that of the formed piezoelectric element 18 may be selectively used from the aforesaid electrically conductive materials. Such electrically conductive materials may be used alone or in a multilayer structure form comprising two or more. Even electrically conductive materials having a Young's modulus of greater than 160 GPa, for instance, Pt (168 GPa), Ni (199 GPa), steel (201.0 GPa), and Fe (211.4 GPa) may be used in the event that in combination with the electrically conductive material(s) having a Young's modulus of up to 160 GPa, they provide a multilayer structure having a Young's modulus of up to 160 GPa.

The mirror portion 14, the mirror support portions 15 and the lower electrodes 17, for instance, may be formed as an integral member by forming the desired resist pattern on the silicon wafer 1, then forming an electrode film by sputtering or the like using the aforesaid electrically conductive material(s) in such a way as to cover that resist pattern, and finally removing the resist pattern simultaneously with removal (lifting-off) of an unnecessary electrode film portion. Alternatively, they may be formed as an integral member by forming an electrode film on the silicon wafer 1 by means of sputtering or the like using the aforesaid electrically conductive material, then forming the desired resist pattern on the electrode film, then etching the electrode film using that resist pattern as a mask, and finally removing an unnecessary resist pattern portion. Yet alternatively, they may be formed as an integral member by printing on the silicon wafer 1 a photosensitive, electrically conductive paste containing the aforesaid electrically conductive material(s), then exposing the electrically conductive paste to light via the desired mask and developing it, and finally sintering it.

It is here noted that at this step, the wire 17a and the terminal 17b (see FIGS. 1 and 4), too, may be formed at the same time.

Figure 30C:
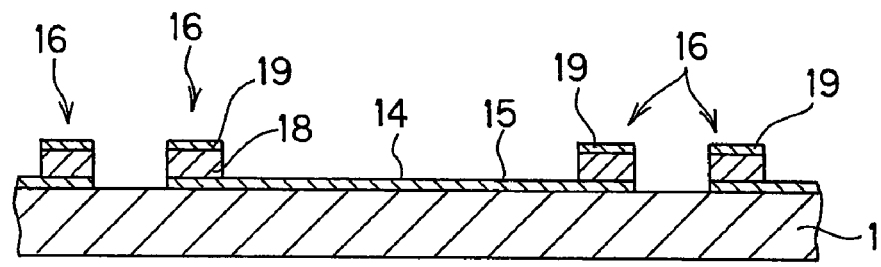
Figure 31C:
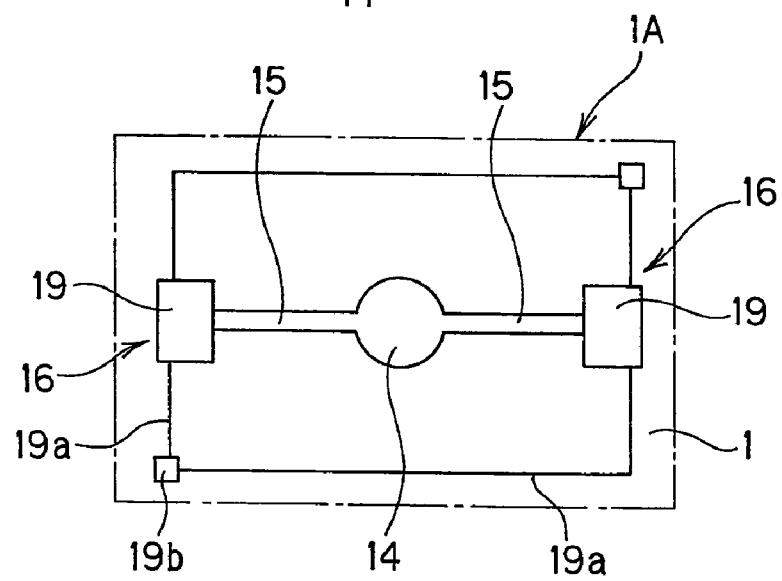

Then, the piezoelectric element 18 is formed on the lower electrodes 17 (FIGS. 30B and 31B), and the upper electrode 19 is formed on the piezoelectric element 18 to form a pair of drive portions 16 that are a multilayer structure of the lower electrodes 17, piezoelectric element 18 and upper electrode 19 (FIGS. 30C and 31C).

The piezoelectric element 18, for instance, may be formed by providing a film in the desired pattern by means of sputtering or the like through a mask, using a conventionally known piezoelectric material such as lead titanate zirconate (PZT), barium titanate (BTO), lead titanate (PTO), lithium niobate ($LiNbO_3$), lithium tantalate ($LiTaO_3$), and lithium tetraborate ($Li_2B_4O_7$), and finally sintering that film. The piezoelectric element 18 formed may have any desired thickness optionally selected from the range of, e.g., 5 to 100 µm.

The upper electrode 19 may be formed of Pt, Au, Ag, Pd, Cu, Sn or the like alone or a combination of two or more. It may have a multilayer structure wherein a surface layer formed of the aforesaid metal(s) is stacked on an underlay metal layer of Cr, Ti, Mo, Ta or the like. The upper electrode 19 may be formed in the same manner as the aforesaid upper electrode 17 is formed, and has any desired thickness optionally selected from the range of, e.g., 300 nm to 5 µm. At this process step, the wire 19a and the terminal 19b (FIGS. 1 and 4), too, may be formed at the same time.

It is noted that when the light reflectance of the electrically conductive material used for the mirror portion 14, the mirror support portions 15 and the lower electrodes 17 is insufficient, a reflective layer comprising a high reflectance material such as Al, Ag, Rh, Au, Cu, and Ni should better be formed on the mirror portion 14 after the completion of formation of the piezoelectric element 18 (sintering step).

Figure 30D:
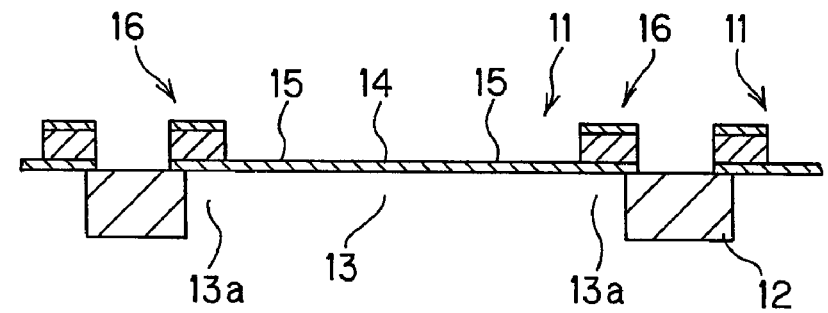
Figure 30E:
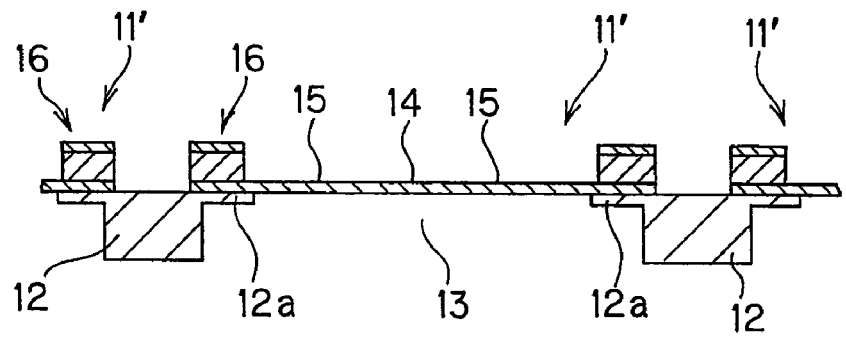

Then, the desired site of the silicon wafer 1 is taken out of another surface of the silicon wafer 1 to form the opening 13, thereby providing the frame portion 12. In that case, the cutout 13a is formed in a part of the site where there are the drive portions 16 positioned, such that it is in contact with the opening 13, thereby preparing a multiplicity of piezoelectric mirror devices 11 (FIG. 30D). Alternatively, instead of the cutout 13a, the thinner portion 12a is formed at a part of the site where there are the drive portions 16 positioned, such that it is in contact with the opening 13, thereby preparing a multiplicity of piezoelectric mirror devices 11' (FIG. 30E).

For instance, the opening 13 and the cutout 13a may be formed in the silicon wafer 1 by forming a resist pattern having openings corresponding to the opening 13 and cutout 13a on another surface of the silicon wafer 1 (free of the mirror portion 14, mirror support portions 15 and drive portions 16), and implementing DRIE (deep reactive ion etching) using that resist pattern as a mask. In that case, at the site where there are the lower electrodes 17, that lower electrodes 17 act as an etching stopper so that the cutout 13a is formed, and at another site, a through-hole is formed through the silicon wafer 1 to form the opening 13.

For the formation of the opening 13 and the thinner portion 12a in the silicon wafer 1, for instance, a resist pattern for the formation of the opening 13 is first formed on another surface of the silicon wafer 1 (free of the mirror portion 14, mirror support portions 15 and drive portions 16), and DRIE (deep reactive ion etching) using that resist pattern as a mask is then implemented down to a depth corresponding to the thickness of the thinner portion 12a. Thereafter, the aforesaid resist pattern is removed to form a resist pattern having openings corresponding to the opening 13 and thinner portion 12a. Finally, DRIE using that resist pattern as a mask is implemented until there is a through-hole formed, thereby forming the opening 13 and thinner portion 12a.

Then, a multiplicity of piezoelectric mirror devices 11 are diced into such individual piezoelectric mirror devices 11 as shown in FIGS. 1, 2 and 3. Likewise, a multiplicity of piezoelectric mirror devices 11' are diced into such individual piezoelectric mirror devices 11' as shown in FIGS. 4, 5 and 6.

It is appreciated that such piezoelectric mirror devices 51, 51' as shown in FIGS. 17 to 20, and such piezoelectric mirror devices 61, 61' as shown in FIGS. 21 to 24 may just as well be fabricated by the aforesaid inventive fabrication process.

Such piezoelectric mirror device 71 as shown in FIGS. 25 to 29, too, may be formed by the aforesaid inventive fabrication process. In this case, on the silicon wafer 1 there are the mirror portion 74, the X-axis mirror support portions 75, the lower electrodes 77, 87 and the Y-axis mirror support portions 85 formed in the order shown in FIGS. 27, 28 and 29. Then, the piezoelectric elements 78, 88 are formed, followed by the formation of the upper electrodes 79, 89. Thereafter, the silicon wafer 1 is etched to form the inner opening 73A and the outer opening 73B, and dicing is implemented, yielding individual piezoelectric mirror devices 71.

(2) FIGS. 32A to 32D and FIGS. 33A and 33B are step diagrams for another embodiment of the inventive fabrication process where the piezoelectric mirror device 21, 21' shown in FIGS. 7 to 10 is taken as an example.

Figure 32A:
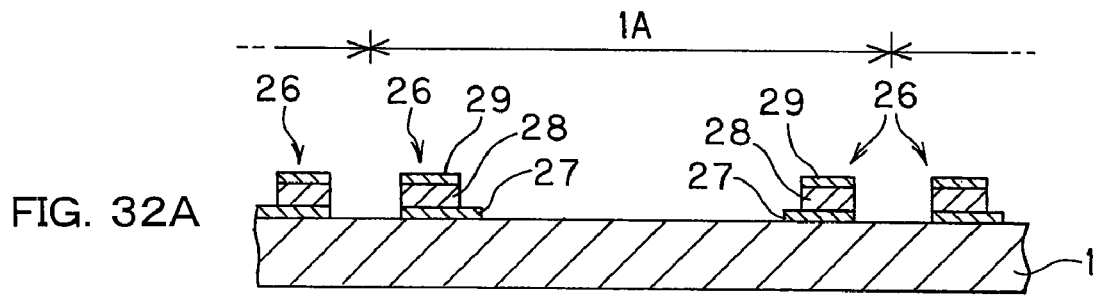
FIGS. 32A to 32D are step diagrams illustrative of another embodiment of the piezoelectric mirror device fabrication process according to the invention.
Figure 33A:
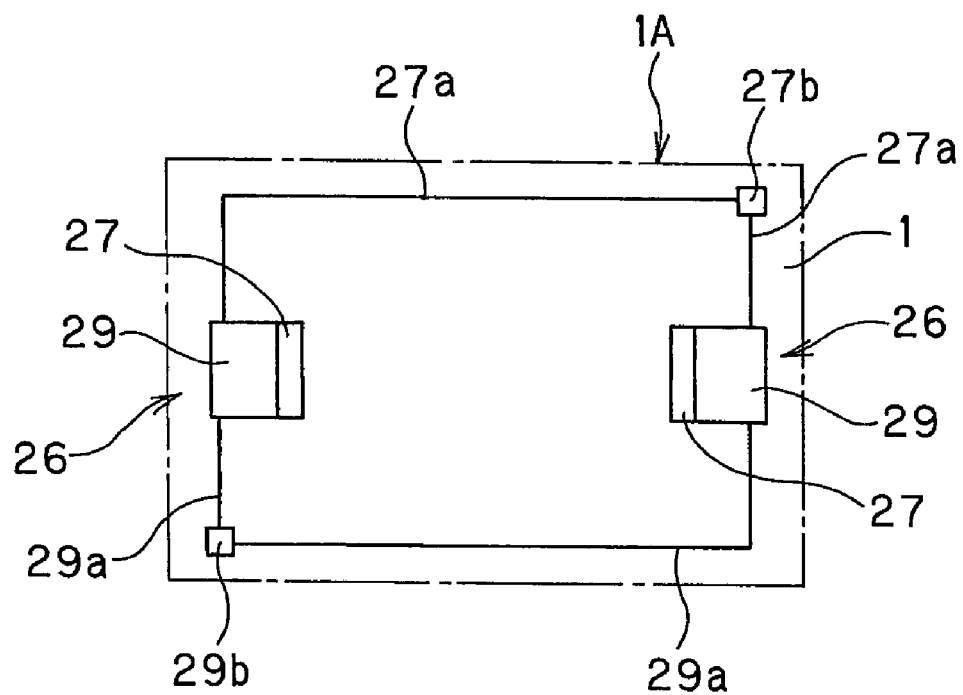
FIGS. 33A to 33B are step diagrams illustrative of yet another embodiment of the piezoelectric mirror device fabrication process according to the invention.

First of all, a silicon wafer 1 is divided into a multiplicity of segments (indicated by 1A in FIG. 32A). Then, on one surface of the silicon wafer 1 per segment, a pair of lower electrodes 27 are provided per segment, and an piezoelectric element 28 and an upper electrode 29 are stacked on the lower electrodes 27 in this order to prepare a pair of drive portions 26 that are a multilayer structure of lower electrodes 27, piezoelectric element 28 and upper electrode 29 (FIGS. 32A and 33A). The lower electrodes 27 forming a part of a pair of drive portions 26 extend mutually toward another pair of drive portions 26 so as to lock mirror support portions 25 there at a later step.

The lower electrodes 27 may each be formed of Pt, Au, Ag, Pd, Cu, Sn or the like alone or in combination of two or more.

Alternatively, it may have a multilayer structure wherein a surface layer formed of the aforesaid metal(s) is formed on an underlay metal layer of Cr, Ti, Mo, Ta or the like. The lower electrodes 27 may be formed as is the case with the lower electrodes 17 in the aforesaid embodiment, and may have any desired thickness optionally selected from the range of, e.g., 300 nm to 5 μm.

The piezoelectric element 28 may be formed as is the case with the piezoelectric element 18 in the aforesaid embodiment, and may have any desired thickness optionally selected from the range of, e.g., 5 to 100 μm.

Likewise, the upper electrode 29 may be formed as is the case with the upper electrode 19 in the aforesaid embodiment, and may have any desired thickness optionally selected from the range of, e.g., 300 nm to 5 μm.

It is here noted that the wire 27a and terminal 27b as well as the wire 29a and terminal 29b (see FIGS. 7 and 9), too, may be formed at the same time.

Figure 32B:
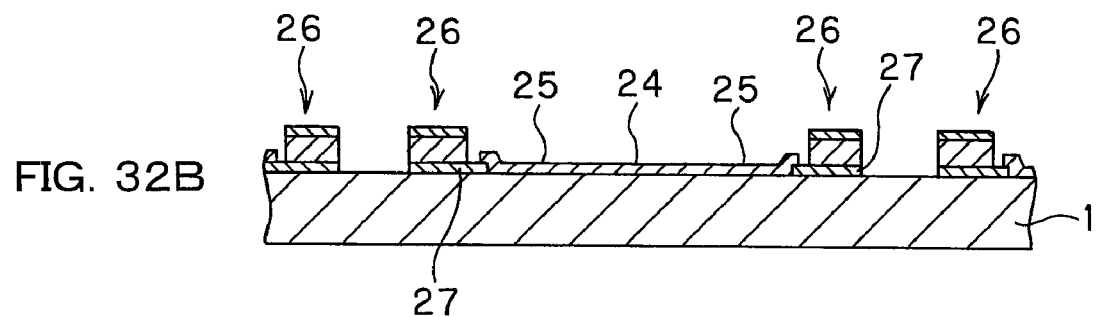
Figure 32C:
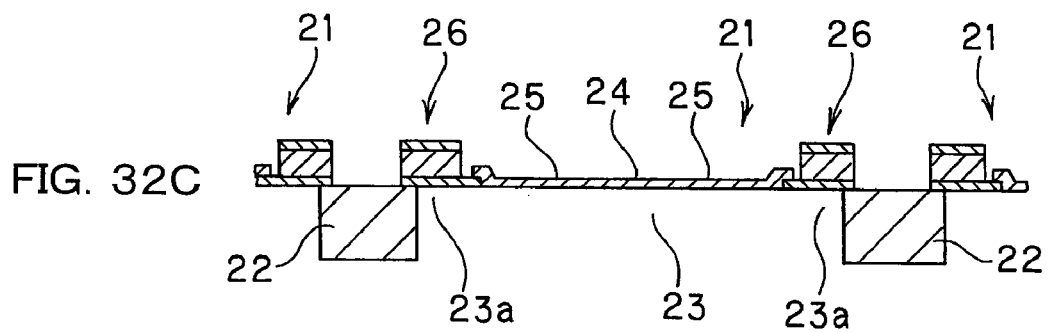
Figure 33B:
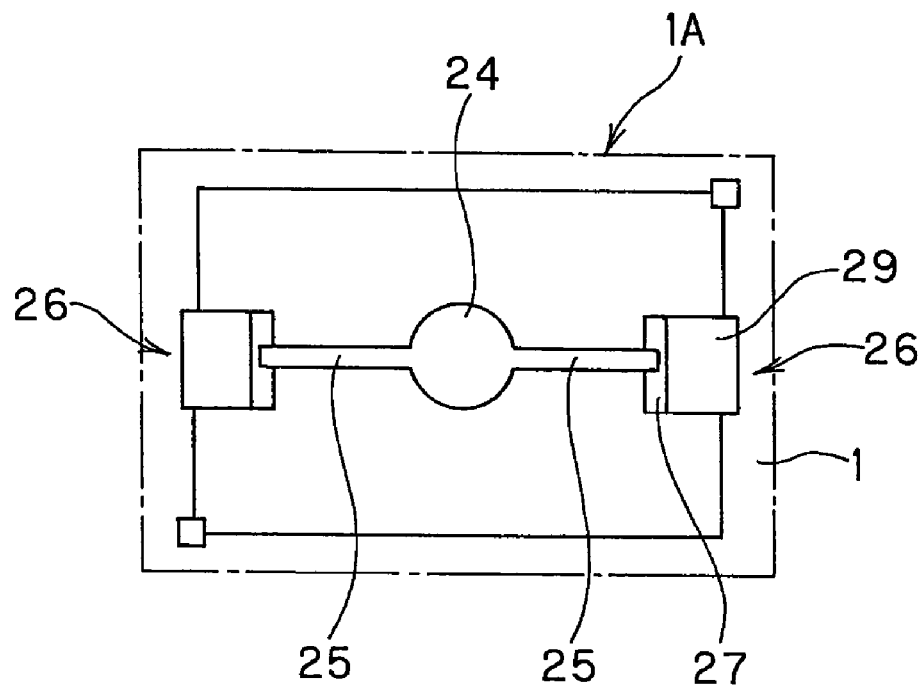

Then, a mirror portion 24 and a pair of mirror support portions 25 adapted to join the mirror portion 24 to the lower electrodes 27 are formed of the material having a Young's modulus of up to 160 GPa such that they are positioned between a pair of drive portions 26 (FIGS. 32B and 33B). For the material having a Young's modulus of up to 160 GPa, just only the electrically conductive materials mentioned in the aforesaid embodiment but also insulating materials such as polyethylene, polystyrene, and polyimide may be used. Such materials may be used alone or in combination of two or more providing a multilayer structure. Further, even materials having a Young's modulus of greater than 160 GPa may be used in the event that in combination with the electrically conductive material(s) having a Young's modulus of up to 160 GPa, they provide a multilayer structure having a Young's modulus of up to 160 GPa. It is here noted that the piezoelectric element 28 has been formed at the previous step; there is no special need of taking care of the melting point of the material used with a Young's modulus of up to 160 GPa.

The mirror portion 24 and mirror support portions 25 may be formed as is the case with the mirror portion 14 and mirror support portions 15 in the aforesaid embodiment. However, it is noted that the mirror support portions 25 are formed such that their ends are locked to the extensions of the lower electrodes 27 forming a part of the drive portions 26.

It is noted that when the light reflectance of the electrically conductive material used for the mirror portion 24 and the mirror support portions 25 is insufficient, a reflective layer comprising a high reflectance material should better be formed on the mirror portion 24. Such a reflective layer may be formed of the same materials as mentioned in the aforesaid embodiment.

Figure 32D:
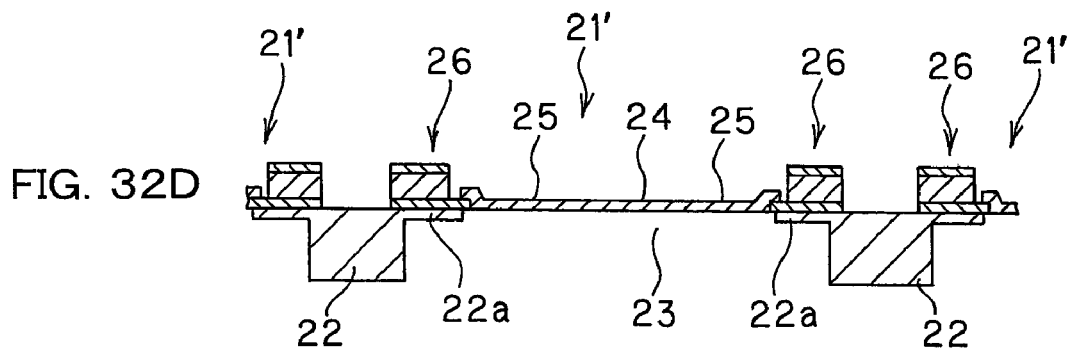

Then, the desired site is removed from another surface of the silicon wafer 1 per segment to form an opening 23, thereby forming a frame portion 22. Here, if the cutout 23a is formed in a part of the site where there are the drive portions 26 positioned, such that it is in contact with the opening 23, a multiplicity of piezoelectric mirror devices 21 are then prepared (FIG. 32C), and if the thinner portion 22a is formed at a part of the site where there are the drive portions 26 positioned, such that it is in contact with the opening 23, a multiplicity of piezoelectric mirror devices 21' are then prepared (FIG. 32D).

The formation of the opening 23 and cutout 23a in the silicon wafer 1, and the formation of the opening 23 and thinner portion 22a in the silicon wafer 1 may be implemented as is the case with the formation of the opening 13 and cutout 13a, and the opening 13 and thinner portion 12a in the aforesaid embodiment.

Then, a multiplicity of piezoelectric mirror devices 21 are diced into such individual piezoelectric mirror devices 21 as shown in FIGS. 7 and 8. Likewise, a multiplicity of piezoelectric mirror devices 21' are diced into such individual piezoelectric mirror devices 21' as shown in FIGS. 9 and 10.

(3) FIGS. 34A to 34C and FIGS. 35A and 35B are step diagrams for yet another embodiment of the inventive fabrication process where the piezoelectric mirror device 31 shown in FIGS. 11 and 12 is taken as an example.

Figure 34A:
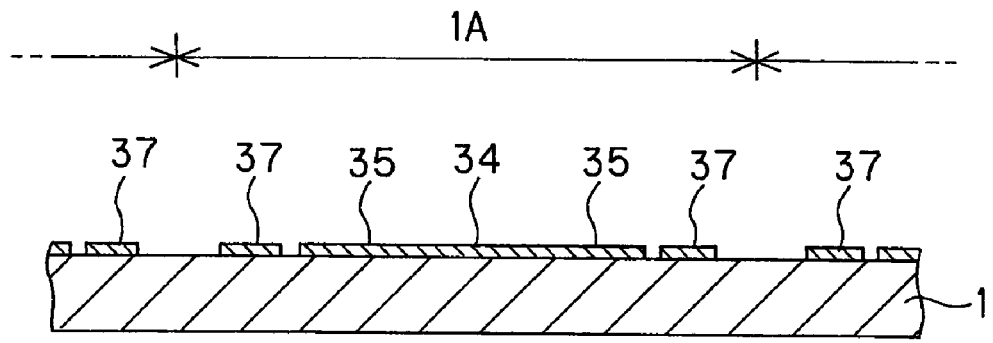
FIGS. 34A to 34C are step diagrams illustrative of a further embodiment of the piezoelectric mirror device fabrication process according to the invention.
Figure 35A:
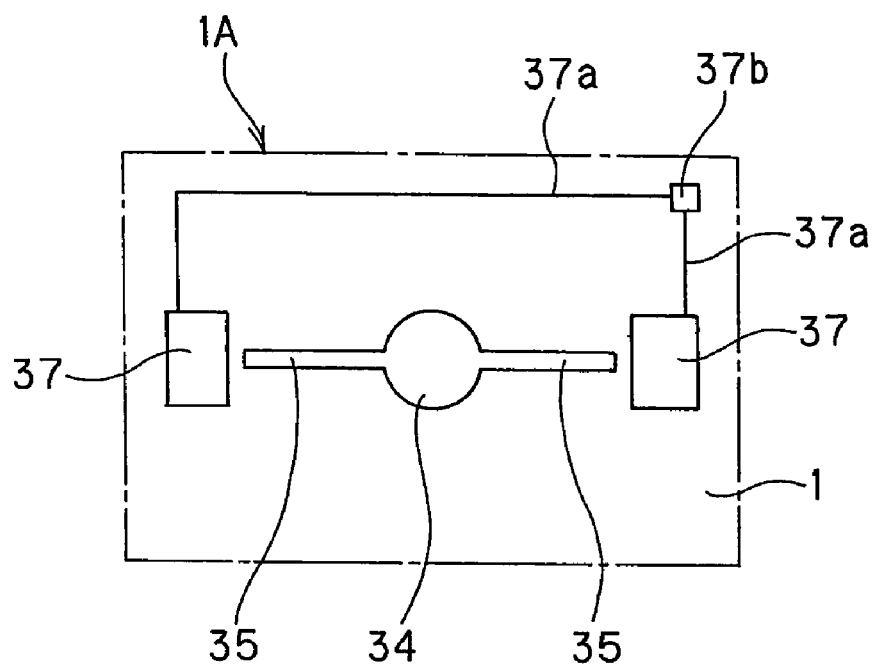
FIGS. 35A to 35B are step diagrams illustrative of a further embodiment of the piezoelectric mirror device fabrication process according to the invention.

First of all, a silicon wafer 1 is divided into a multiplicity of segments (indicated by 1A in FIG. 33A). Then, on one surface of the silicon wafer 1 per segment, a pair of lower electrodes 37, a mirror portion 34 positioned between the lower electrodes 37, and a pair of mirror support portions 35 adapted to support the mirror portion 34 are each formed of the material having a Young's modulus of up to 160 GPa (FIGS. 34A and 35A). The lower electrodes 37, mirror portion 34 and mirror support portion 35 may be formed as is the case with the lower electrodes 17, mirror portion 14 and mirror support portions 15 in the aforesaid embodiment. However, the mirror support portions 35 are formed such that their ends provide positions where they are lockable to the thinner portion 32a formed later. The material used with a Young's modulus of up to 160 GPa has a melting point higher than that of the piezoelectric element 38 formed later, thereby ensuring that the mirror portion 34, mirror support portions 35 and lower electrodes 37 do not melt during sintering for the later formation of the piezoelectric element 38.

It is here noted that at this step, a wire 37a and a terminal 37b (see FIG. 11) may be formed at the same time, too, and that when the light reflectance of the electrically conductive material used for the mirror portion 34 and the mirror support portions 35 is insufficient, a reflective layer comprising a high reflectance material should better be formed on the mirror portion 34. Such a reflective layer may be formed of the same materials as mentioned in the aforesaid embodiment.

Figure 34B:
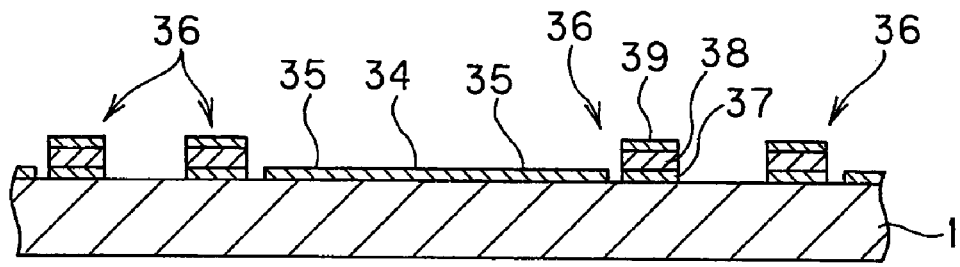
Figure 35B:
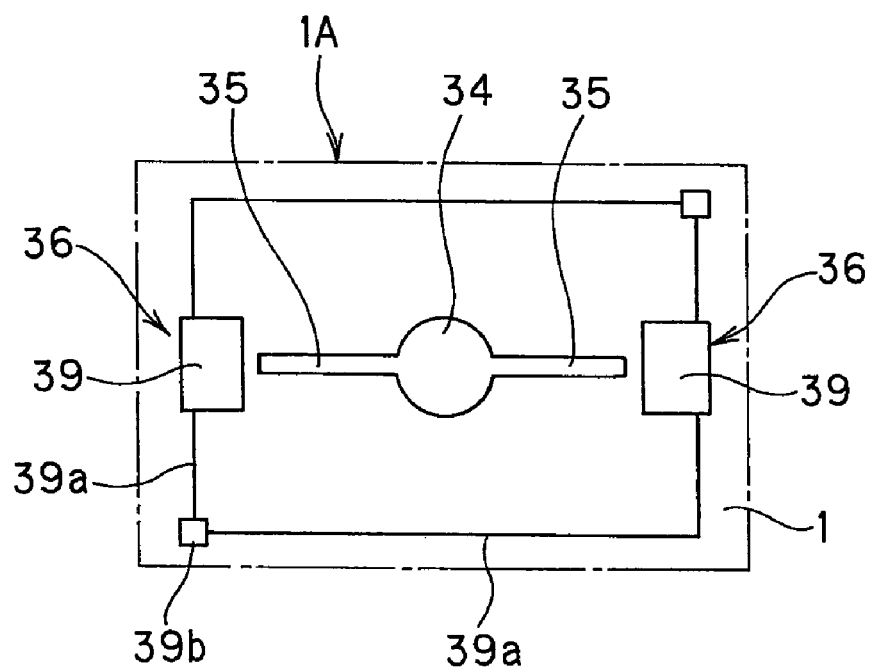

Then, the piezoelectric element 38 and upper electrode 39 are formed on the lower electrodes 37 to form a pair of drive portions 36 that are a multilayer structure of the lower electrode 37, piezoelectric element 38 and upper electrode 39 (FIGS. 34B and 35B). The formation of the piezoelectric element 38 and upper electrode 39 may be implemented as is the case with the formation of the piezoelectric element 18 and upper electrode 19 in the aforesaid embodiment.

It is here noted that at this step, the wire 39a and terminal 39b (see FIG. 11) may be formed at the same time, too.

Figure 34C:
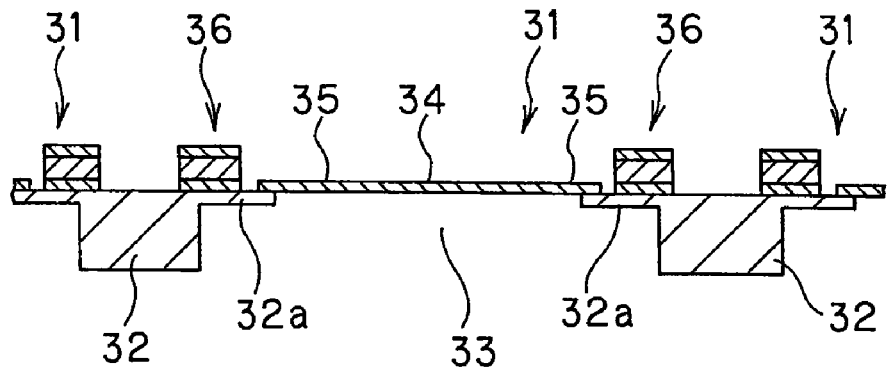

Then, the desired site is removed from another surface of the silicon wafer 1 per segment to form an opening 33, thereby forming a frame portion 32, and a thinner portion 32a is formed in a part of the site where there are the drive portions 36 positioned, such that it is in contact with the opening 33, whereby a multiplicity of piezoelectric mirror devices 31 are prepared (FIG. 34C).

The formation of the opening 33 and thinner portion 32a in the silicon wafer 1 may be implemented as is the case with the formation of the opening 13 and thinner portion 12a in the aforesaid embodiment.

Then, a multiplicity of piezoelectric mirror devices 31 are diced into such individual piezoelectric mirror devices 31 as shown in FIGS. 11 and 12.

Figure 36A:
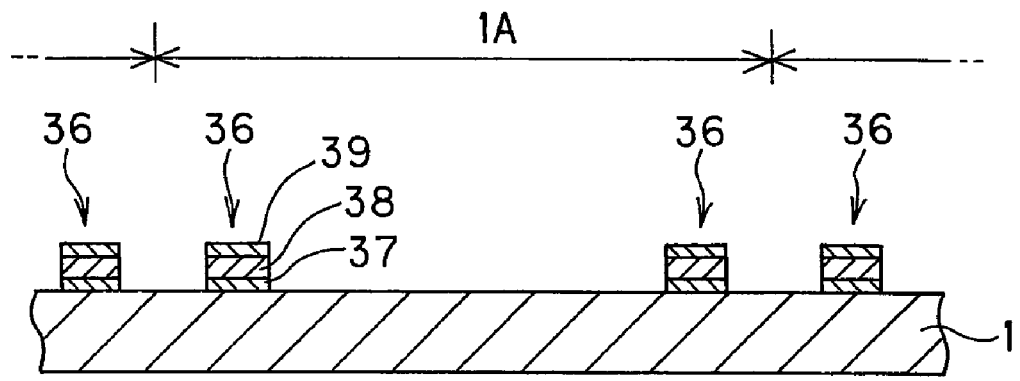
FIGS. 36A to 36C are step diagrams illustrative of a further embodiment of the piezoelectric mirror device fabrication process according to the invention.
Figure 36B:
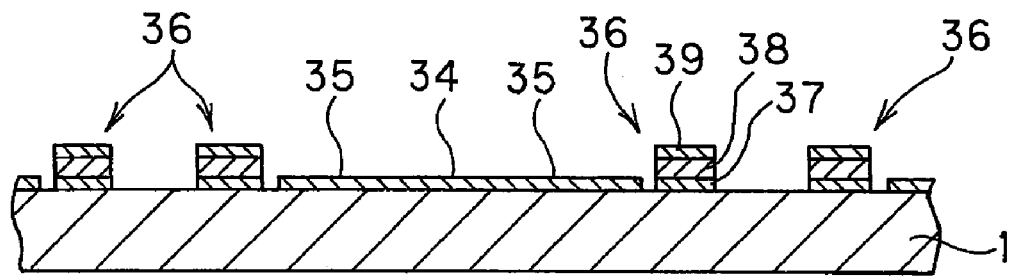
Figure 36C:
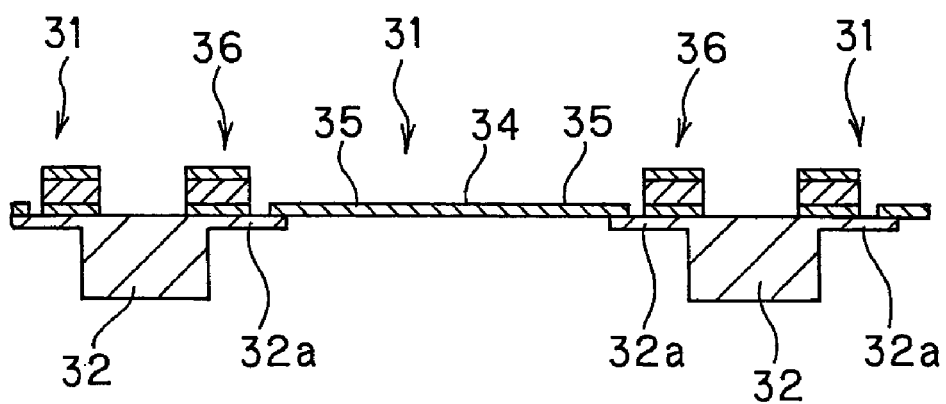

FIGS. 36A, 36B and 36C are step diagrams for a further embodiment of the inventive fabrication process where the piezoelectric mirror device 31 shown in FIGS. 11 and 12 are taken as an example.

First of all, a silicone wafer 1 is divided into a multiplicity of segments (indicated by 1A in FIG. 36A). On one surface of the silicon wafer 1 per segment, a pair of lower electrodes 37 are provided, and a piezoelectric element 38 and an upper electrode 39 are stacked on the lower electrodes 37 in this order to prepare a pair of drive portions 36 that are a multilayer of the lower electrodes 37, piezoelectric element 38 and upper electrode 39 (FIG. 36A). The drive portions 36 may be formed as is the case with the drive portions 26 in the aforesaid embodiment.

It is here noted that at this step, the wire 37a and terminal 37b, and the wire 39a and terminal 39b (see FIG. 11) may be formed at the same time, too.

Then, a mirror portion 34 and a pair of mirror support portions 35 adapted to support the mirror portion 34 are integrally formed of the material having a Young's modulus of up to 160 GPa such that they are positioned between a pair of drive portions 36 (FIG. 36B). For the material having a Young's modulus of up to 160 GPa, the materials mentioned in the aforesaid embodiment may be used. Further, even materials having a Young's modulus of greater than 160 GPa may be used in the event that in combination with the electrically conductive material(s) having a Young's modulus of up to 160 GPa, they provide a multilayer structure having a Young's modulus of up to 160 GPa. It is here noted that the piezoelectric element 38 has been formed at the previous step; there is no special need of taking care of the melting point of the material used with a Young's modulus of up to 160 GPa.

The mirror portion 34 and mirror support portions 35 may be formed as is the case with the mirror portion 34 and mirror support portions 35 in the aforesaid embodiment. However, it is noted that the mirror support portions 35 are formed such that their ends provide positions to which the thinner portion 32a formed later is lockable.

It is noted that when the light reflectance of the material used for the mirror portion 34 and the mirror support portions 35 is insufficient, a reflective layer comprising a high reflectance material should better be formed on the mirror portion 34. Such a reflective layer may be formed of the same materials as mentioned in the aforesaid embodiment.

Then, the desired site is removed from another surface of the silicon wafer 1 per segment to form an opening 33, thereby forming a frame portion 32, and the thinner portion 32a is formed in a part of the site where there are the drive portions 36 positioned, such that it is in contact with the opening 33, whereby a multiplicity of piezoelectric mirror devices 31 are prepared (FIG. 36C).

The formation of the opening 33 and thinner portion 32a in the silicon wafer 1 may be implemented as is the case with the formation of the opening 13 and thinner portion 12a in the aforesaid embodiment.

Then, a multiplicity of piezoelectric mirror devices 31 are diced into such individual piezoelectric mirror devices 31 as shown in FIGS. 11 and 12.

(4) FIGS. 37A-37E and FIGS. 38A-38C are step diagrams for a further embodiment of the inventive fabrication process where the piezoelectric mirror device 41, 41' shown in FIGS. 13 to 16 is taken as an example.

Figure 37A:
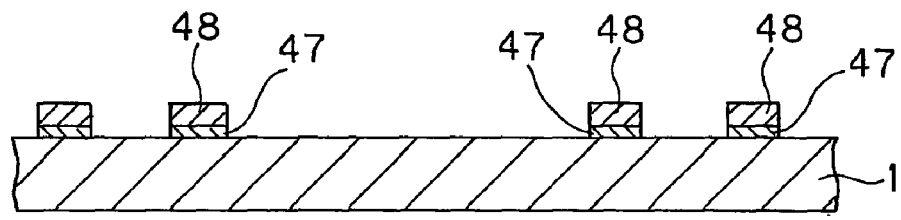
FIGS. 37A to 37E are step diagrams illustrative of a further embodiment of the piezoelectric mirror device fabrication process according to the invention.
Figure 38A:
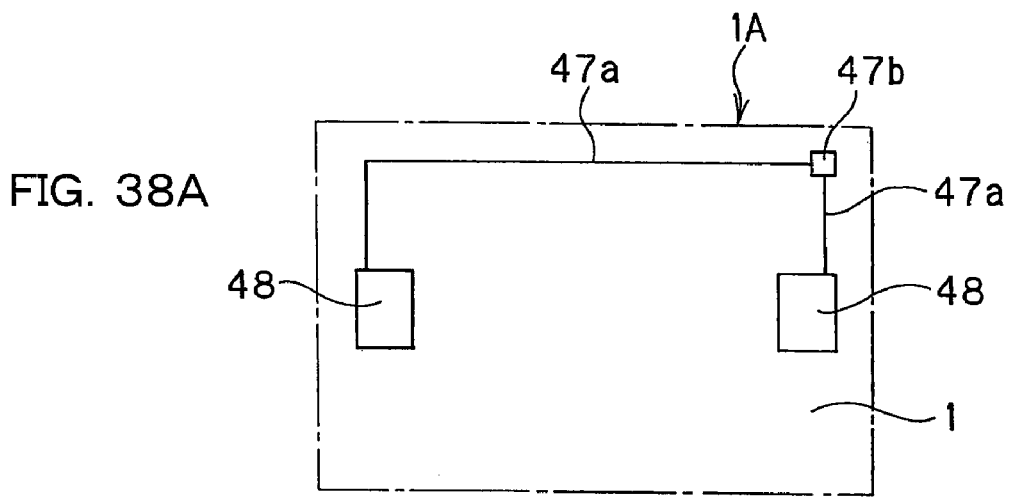
FIGS. 38A to 38C are step diagrams illustrative of a further embodiment of the piezoelectric mirror device fabrication process according to the invention.

First of all, a silicone wafer 1 is divided into a multiplicity of segments (indicated by 1A in FIG. 37A). On one surface of the silicon wafer 1 per segment, a pair of lower electrodes 47 are provided, and a piezoelectric element 48 is formed on the lower electrodes 47 (FIGS. 37A and 38A). The formation of the lower electrodes 47 and piezoelectric element 48 may be implemented as is the case with the formation of the lower electrodes 27 and piezoelectric element 28 in the aforesaid embodiment.

It is here noted that at this step, the wire 47a and terminal 47b (see FIGS. 13 and 15) may be formed at the same time, too.

Figure 37B:
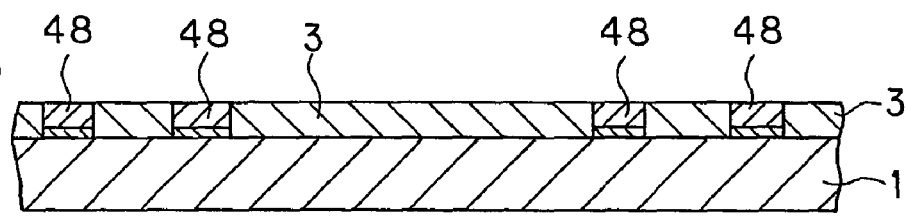
Figure 37C:
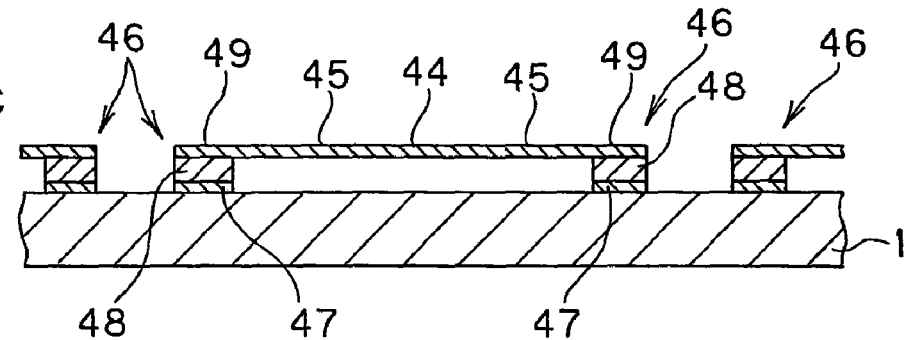
Figure 37D:
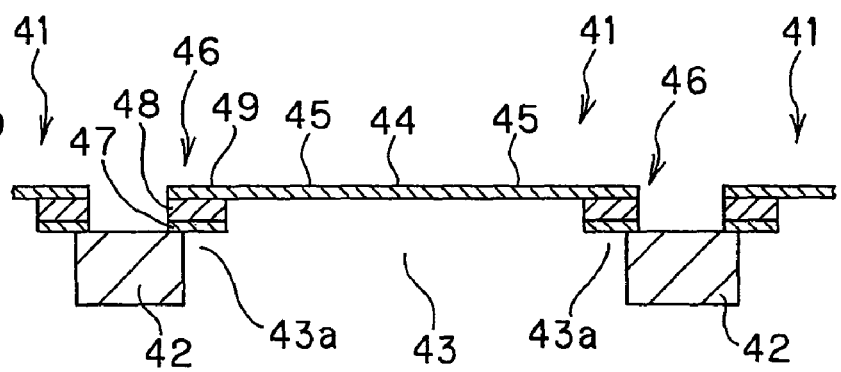
Figure 38B:
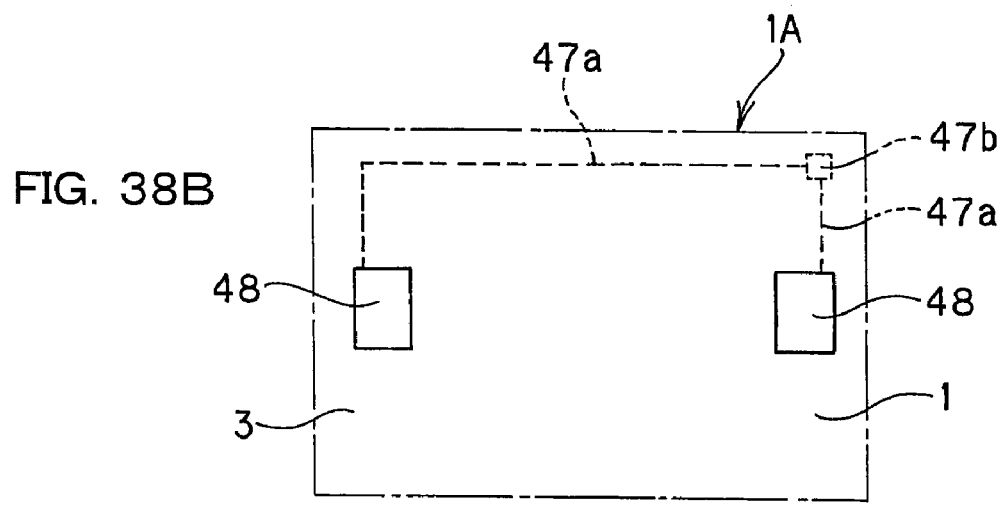
Figure 38C:
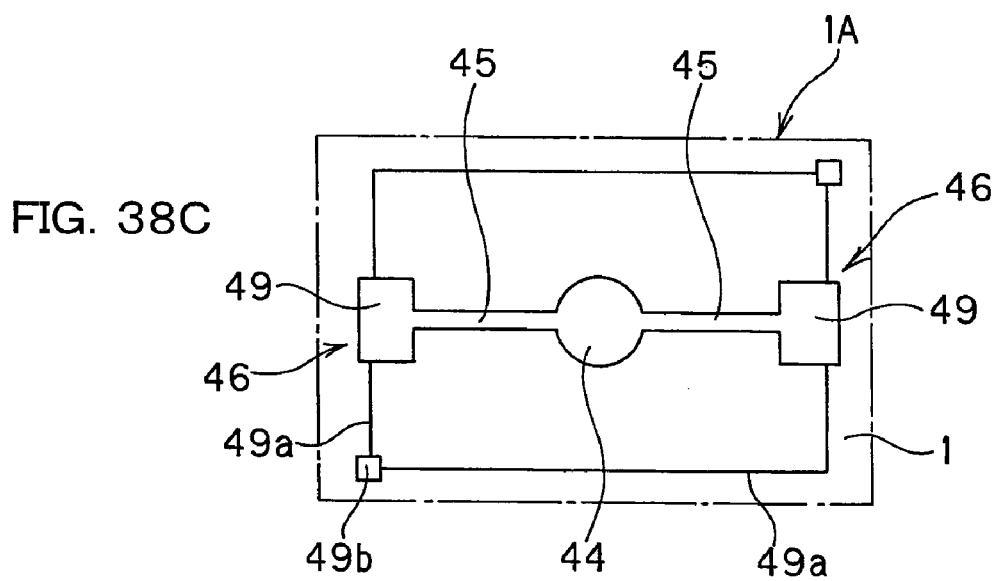

Then, a resist layer 3 is formed in such a way as to expose the upper surface of the piezoelectric element 48 to view, thereby forming a flat surface (FIGS. 37B and 38B).

Then, the upper electrode 49 positioned on the exposed piezoelectric element 48, a mirror portion 44 between the upper electrodes 49, and a pair of mirror support portions 45 adapted to join the mirror portion 44 to the upper electrode 49 are integrally formed of the electrically conductive material having a Young's modulus of up to 160 PGa, after which an unnecessary portion of the resist layer 3 is removed (FIGS. 37C and 38C), whereby a pair of drive portions 46 that are a multilayer structure of the lower electrodes 47, piezoelectric element 48 and upper electrode 49 are formed, and the mirror portion 44 and mirror support portions 45 are provided between the drive portions 46. For the electrically conductive material having a Young's modulus of up to 160 GPa, use may be made of those mentioned in the aforesaid embodiment. Such materials may be used alone or in combination of two or more providing a multilayer structure. Further, even materials having a Young's modulus of greater than 160 GPa may be used in the event that in combination with material(s) having a Young's modulus of up to 160 GPa, they provide a multilayer structure having a Young's modulus of up to 160 GPa. It is here noted that the piezoelectric element 48 has been formed at the previous step; there is no special need of taking care of the melting point of the material used with a Young's modulus of up to 160 GPa.

The integral formation of the mirror portion 44, mirror support portions 45 and upper electrode 49 may be implemented as is the case with the formation of the mirror portion 14, mirror support portions 15 and lower electrode 17 in the aforesaid embodiment.

It is here noted that at this step, the wire 49a and terminal 49b (see FIGS. 13 and 15) may be formed at the same time, too.

Figure 37E:
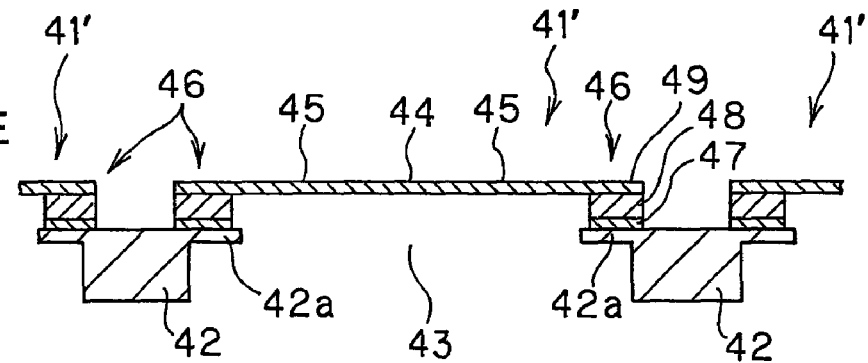

Then, the desired site is removed from another surface of the silicon wafer 1 per segment to form an opening 43, thereby forming a frame portion 42. Here, if a cutout 43a is formed in a part of the site where there are the drive portions 46 positioned, such that it is in contact with the opening 43, a multiplicity of piezoelectric mirror devices 41 are prepared (FIG. 37D), and if a thinner portion 42a is formed in a part of the site where there are the drive portions 46 positioned, such that it is in contact with the opening 43, a multiplicity of piezoelectric mirror devices 41' are prepared (FIG. 37E).

The formation of the opening 43 and cutout 43a in the silicon wafer 1, and the formation of the opening 43 and thinner portion 42a in the silicon wafer 1 may be implemented as is the case with the formation of the opening 13 and cutout 13a, and the opening 13 and thinner portion 12a in the aforesaid embodiment.

Then, a multiplicity of piezoelectric mirror devices 41 are diced into such individual piezoelectric mirror devices 41 as shown in FIGS. 13 and 14. Likewise, a multiplicity of piezoelectric mirror devices 41' are diced into such individual piezoelectric mirror devices 41' as shown in FIGS. 15 and 16.

Such inventive fabrication processes as described above make use of silicon wafers, or they dispenses with the use of SOI wafers having a silicon oxide layer, so that fabrication costs can be curtailed.

It is here noted that the above fabrications processes of piezoelectric mirror devices are provided for the purpose of illustration alone, and so the invention is never limited to them.

[Optical Equipment]

The optical equipment according to the invention is now explained.

Figure 39:
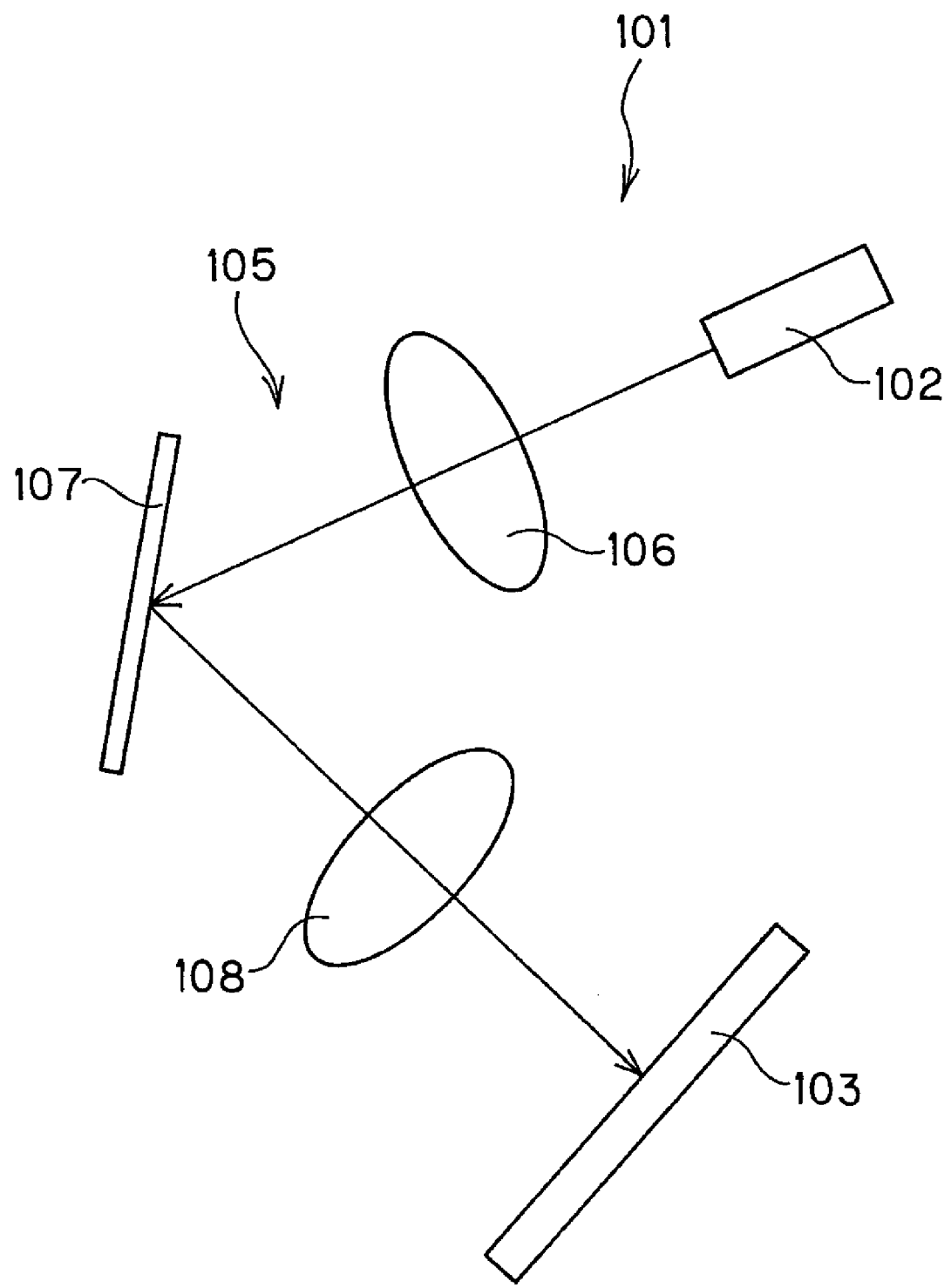
FIG. 39 is illustrative in construction of one embodiment of the optical equipment according to the invention.

FIG. 39 is illustrative in construction of the optical equipment of the invention embodied as an image display such as a display or projector. Referring to FIG. 39, an optical equipment 101 of the invention comprises a laser light source 102, a projection screen 103, and an optical system 105 adapted to guide light leaving the laser light source 102 to the projection screen 103. The optical system 105 of this optical equipment 101 includes a condenser lens group 106, a piezoelectric mirror device 107, and a projector lens group 108, wherein that piezoelectric mirror device 107 is defined by the inventive piezoelectric mirror device. The inventive piezoelectric mirror device used here, for instance, may be of the biaxial type wherein upon reflection of incident light from the condenser lens group 106 toward the projector lens group 108, the X/Y (horizontal/vertical) directions can be scanned. And by the thus scanned laser light, images can be displayed on the projection screen 103 via the projector lens group 108.

It is here noted that the aforesaid optical equipment is given for the purpose of illustration alone; the invention is never limited to its embodiment.

The invention is now explained in more details with reference to more specific examples.

EXAMPLE 1

A 625-μm thick silicon wafer was divided into a multiplicity of square segments, each having one side of 5.5 mm. On one surface of the silicon wafer there was a photosensitive resist (LA900 made by Tokyo Ohka Kogyo Co., Ltd.) coated by spin coating, and that resist was exposed to light via a mask and then developed to form a segmented resist pattern. A Ti thin film (of 30 nm in thickness) having a Young's modulus of 115.7 GPa and an Au thin film (of 1 μm (1,000 nm) in thickness) having a Young's modulus of 78.0 GPa were coated and stacked by sputtering over that resist pattern to form an electrode film. This electrode film (multilayer structure) was going to have a calculated Young's modulus of 79.1 GPa. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, a pair of lower electrodes, a mirror portion positioned between the lower electrodes and a pair of mirror support portions adapted to join the mirror portion to the lower electrodes were formed as one integral piece. The thus formed mirror support portions each had a width of 10 μm, and simultaneously at this step, wires and terminals connected to the lower electrodes were formed, too.

Then, lead zirconate titanate (PZT) was sputtered on a pair of lower electrodes via a mask to form a thin film, and then sintered (at 600° C. for 120 minutes) to prepare a piezoelectric element (of 10 μm in thickness).

Then, a photosensitive resist (LA900 made by Tokyo Ohka Kogyo Co., Ltd.) was spin coated on the silicon wafer with the piezoelectric element thus formed on it, exposed to light via a mask, and then developed to form a resist pattern for upper electrode formation. A Cr thin film (of 50 nm in thickness) and an Au thin film (of 300 nm in thickness) were coated and stacked by sputtering over that resist pattern to form an electrode film. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, a pair of upper electrodes were formed on the aforesaid piezoelectric element. Simultaneously at this step, wires and terminals connected to the upper electrodes were formed, too.

Thus, a drive portion built up of a multilayer structure comprising the lower electrodes, piezoelectric element and upper electrodes was formed.

Then, on another surface of the silicon wafer there was a photosensitive resist (LA900 made by Tokyo Ohka Kogyo Co., Ltd.) spin coated, which was in turn exposed to light via a mask and then developed to form a resist pattern for the formation of an opening and a cutout. Then, this resist pattern was used as a mask to implement DRIE (deep reactive ion etching), whereby at a site where there were the lower electrodes, they acted as an etching stopper thereby forming the cutout, and at another site, a through-hole was formed through the silicon wafer thereby forming the opening. In this way, a multiplicity of piezoelectric mirror devices were prepared.

Finally, the aforesaid multiplicity of piezoelectric mirror devices were diced into such individual piezoelectric mirror devices as shown in FIGS. 1, 2 and 3.

EXAMPLE 2

A 625-μm thick silicon wafer was divided into a multiplicity of square segments, each having one side of 5.5 mm. On one surface of the silicon wafer there was a photosensitive resist (LA900 made by Tokyo Ohka Kogyo Co., Ltd.) coated by spin coating, and that resist was exposed to light via a mask and then developed to form a segmented resist pattern for lower electrodes. A Ti thin film (of 50 nm in thickness) and a Pt thin film (of 300 nm in thickness) were stacked by sputtering over that resist pattern to form an electrode film. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, a pair of lower electrodes were formed, and simultaneously at this step, wires and terminals connected to the lower electrodes were formed, too.

Then, lead zirconate titanate (PZT) was sputtered on a pair of lower electrodes via a mask to form a thin film, and then sintered (at 600° C. for 120 minutes) to prepare a piezoelectric element (of 10 μm in thickness). Note here that the piezoelectric element was formed such that one of the lower electrodes had a smaller area than that of another lower electrode so that it was exposed 1,000 μm in the direction of another.

Then, a photosensitive resist (LA900 made by Tokyo Ohka Kogyo Co., Ltd.) was spin coated on the silicon wafer with the piezoelectric element thus formed on it, exposed to light via a mask, and then developed to form a resist pattern for upper electrode formation. A Cr thin film (of 50 nm in thickness) and an Au thin film (of 300 nm in thickness) were stacked by sputtering over that resist pattern to form an electrode film. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, there were a pair of upper electrodes formed on the aforesaid piezoelectric element. Simultaneously at this step, wires and terminals connected to the upper electrodes were formed, too.

Thus, a drive portion built up of a multilayer structure comprising the lower electrodes, piezoelectric element and upper electrodes was formed.

Then, on the silicon wafer with a pair of drive portions formed on it, there was a photosensitive resist (LA900 made by Tokyo Ohka Kogyo Co., Ltd.) spin coated, which was in turn exposed to light and then developed to form a resist pattern for the formation of a mirror portion and mirror support portions. A Ti thin film (of 30 nm in thickness) having a Young's modulus of 115.7 GPa and an Au thin film (of 1 μm (1,000 nm)) having a Young's modulus of 78.0 GPa were coated and stacked by sputtering over that resist pattern to form a thin film. This thin film (multilayer structure) was going to have a calculated Young's modulus of 79.1. Then, AZ Remover manufactured by AZ electronic Materials Co., Ltd. was used for the application of ultrasonic waves thereby removing the aforesaid resist pattern and, at the same time, lifting off the thin film on the resist pattern. In this way, a mirror portion positioned between a pair of drive portions and a pair of mirror support portions adapted to join the mirror portion to the lower electrodes were formed as an integral piece. The thus formed mirror support portions each had a width of 10 μm.

Then, on another surface of the silicon wafer there was a photosensitive resist (LA900 made by Tokyo Ohka Kogyo Co., Ltd.) spin coated, which was in turn exposed to light via a mask and then developed to form a resist pattern for the formation of an opening. Then, this resist pattern was used as a mask to implement DRIE (deep reactive ion etching) down to a depth of 605 μm. Then, the aforesaid resist pattern was removed, and the photosensitive resist was again spin coated, exposed to light via a mask and thereafter developed to form a resist pattern for the formation of an opening and a thinner portion. Then, DRIE (deep reactive ion etching) was implemented with that resist patter used as a mask, until the opening was formed, whereby there was a 20-μm thick thinner portion formed at a site where there were the lower electrodes. In this way, a multiplicity of piezoelectric mirror devices were prepared.

Finally, the aforesaid multiplicity of piezoelectric mirror devices were diced into such individual piezoelectric mirror devices as shown in FIGS. 9 and 10.

EXAMPLE 3

A 625-μm thick silicon wafer was divided into a multiplicity of square segments, each having one side of 5.5 mm. On one surface of the silicon wafer there was a photosensitive resist (LA900 made by Tokyo Ohka Kogyo Co., Ltd.) coated by spin coating, and that resist was exposed to light via a mask and then developed to form a segmented resist pattern. A Ti thin film (of 30 nm in thickness) having a Young's modulus of 115.7 GPa and an Au thin film (of 1 μm (1,000 nm) in thickness) having a Young's modulus of 78.0 GPa were coated and stacked by sputtering over that resist pattern to form an electrode film. This electrode film was going to have a calculated Young's modulus of 79.1. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, a pair of lower electrodes, a mirror portion positioned between the lower electrodes and a pair of mirror support portions joined to the mirror portion were formed. The thus formed mirror support portions each had a width of 10 mm with a distance of 500 mm between the ends of the mirror support portions and the lower electrodes, and simultaneously at this step, wires and terminals connected to the lower electrodes were formed, too.

Then, lead zirconate titanate (PZT) was sputtered on a pair of lower electrodes via a mask to form a thin film, and then sintered (at 600° C. for 120 minutes) to prepare a piezoelectric element (of 10 μm in thickness).

Then, a photosensitive resist (LA900 made by Tokyo Ohka Kogyo Co., Ltd.) was spin coated on the silicon wafer with the piezoelectric element thus formed on it, exposed to light via a mask, and then developed to form a resist pattern for upper electrode formation. A Cr thin film (of 50 nm in thickness) and an Au thin film (of 300 nm in thickness) were coated and stacked by sputtering over that resist pattern to form an electrode film. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, there were a pair of upper electrodes formed on the aforesaid piezoelectric element. Simultaneously at this step, wires and terminals connected to the upper electrodes were formed, too.

Thus, a drive portion built up of a multilayer structure comprising the lower electrodes, piezoelectric element and upper electrodes was formed.

Then, on another surface of the silicon wafer there was a photosensitive resist (LA900 made by Tokyo Ohka Kogyo Co., Ltd.) spin coated, which was in turn exposed to light via a mask and then developed to form a resist pattern for the formation of an opening. Then, this resist pattern was used as a mask to implement DRIE (deep reactive ion etching) down to a depth of 605 μm. Then, the aforesaid resist pattern was removed, and the photosensitive resist was again spin coated, exposed to light via a mask and thereafter developed to form a resist pattern for the formation of an opening and a thinner portion. Then, DRIE (deep reactive ion etching) was implemented with that resist patter used as a mask, until the opening was formed, whereby there was a 20-μm thick thinner portion formed at a site where there were the lower electrodes and at an area from the ends of the mirror support portions to 1,000 mm in a direction toward the mirror portion, and the opening was provided between the mirror support portions and the mirror portion while the ends of the mirror support portions were locked to that thinner portion. In this way, a multiplicity of piezoelectric mirror devices were prepared.

Finally, the aforesaid multiplicity of piezoelectric mirror devices were diced into such individual piezoelectric mirror devices as shown in FIGS. 11 and 12.

EXAMPLE 4

A 625-μm thick silicon wafer was divided into a multiplicity of square segments, each having one side of 5.5 mm. On one surface of the silicon wafer there was a photosensitive resist (LA900 made by Tokyo Ohka Kogyo Co., Ltd.) coated by spin coating, and that resist was exposed to light via a mask and then developed to form a segmented resist pattern for lower electrode formation. A Ti thin film (of 30 nm in thickness) and a Pt thin film (of 300 nm in thickness) were coated and stacked by sputtering over that resist pattern to form an electrode film. Then, AZ Remover manufactured by AZ Electronic Materials Co., Ltd. was used for the application of ultrasonic waves thereby removing the aforesaid resist pattern and, at the same time, lifting off the electrode film on the resist pattern. In this way, a pair of lower electrodes were formed, and simultaneously at this step, wires and terminals connected to the lower electrodes were formed, too.

Then, lead zirconate titanate (PZT) was sputtered on a pair of lower electrodes via a mask to form a film, and then sintered (at 600° C. for 120 minutes) to prepare a piezoelectric element (of 10 μm in thickness).

Then, a positive type photosensitive resist (AZ5218 manufactured by AZ Electronic Materials Co., Ltd.) was spin coated on the silicon wafer with the lower electrodes and piezoelectric element thus formed on it, and areas except between the piezoelectric elements were exposed to light, and then developed to expose the surfaces of the piezoelectric elements and make the piezoelectric elements and a site between them flat. Then, a photosensitive resistive (LA900 made by Tokyo Ohka Kogyo Co., Ltd.) was spin coated, exposed to light and then developed to form a resist pattern. A Ti thin film (50 nm in thickness) having a Young's modulus of 115.7 GPa and an Au thin film (of 5 μm (5,000 nm) in thickness) having a Young's modulus of 78.0 GPa were coated and stacked by sputtering on that resist pattern to form an electrode film. This electrode film (multilayer structure) was going to have a calculated Young's modulus of 78.4 GPa. Then, AZ Remover manufactured by AZ Electronic Materials Co., Ltd. was used for the application of ultrasonic waves thereby removing all the aforesaid resist patterns and, at the same time, lifting off the electrode film on the resist pattern, whereby a pair of upper electrodes positioned on the piezoelectric element, a mirror portion positioned between the upper electrodes and a pair of mirror support portions adapted to join the mirror portion to the upper electrodes were formed as one integral piece. Thus, a drive portion built up of a multilayer structure comprising the lower electrodes, piezoelectric element and upper electrodes was formed, and the mirror support portions each had a width of 10 μm. Note here that simultaneously at this step, wires and terminals connected to the upper electrodes were formed, too.

Then, on another surface of the silicon wafer there was a photosensitive resist (LA900 made by Tokyo Ohka Kogyo Co., Ltd.) spin coated, which was in turn exposed to light via a mask and then developed to form a resist pattern for the formation of an opening and a cutout. Then, this resist pattern was used as a mask to implement DRIE (deep reactive ion etching), whereby at a site where there were the lower electrodes, they acted as an etching stopper thereby forming the cutout, and at another site, a through-hole was formed through the silicon wafer thereby forming the opening. In this way, a multiplicity of piezoelectric mirror devices were prepared.

Finally, the aforesaid multiplicity of piezoelectric mirror devices were diced into such individual piezoelectric mirror devices as shown in FIGS. 13 and 14.

EXAMPLE 5

Such individual piezoelectric mirror devices as shown in FIGS. 1, 2 and 3 were obtained following Example 1 with the exception that a Ti thin film (of 200 nm in thickness) having a Young's modulus of 115.7 GPa and an Au thin film (of 1 μm (1,000 nm) in thickness) having a Young's modulus of 78.0 GPa were stacked together by sputtering into an electrode film. The electrode film (multilayer structure) here had a calculated Young's modulus of 84.2.

EXAMPLE 6

Such individual piezoelectric mirror devices as shown in FIGS. 1, 2 and 3 were obtained following Example 1 with the exception that an Au thin film (of 1 μm (1,000 nm) in thickness) having a Young's modulus of 78.0 GPa was formed by sputtering into an electrode film.

EXAMPLE 7

Such individual piezoelectric mirror devices as shown in FIGS. 1, 2 and 3 were obtained following Example 1 with the exception that a Ti thin film (of 400 nm in thickness) having a Young's modulus of 115.7 GPa and a Pt thin film (of 1 μm (1,000 nm) in thickness) having a Young's modulus of 168 GPa were stacked together by sputtering into an electrode film. The electrode film (multilayer structure) here had a calculated Young's modulus of 152.9.

EXAMPLE 8

Such individual piezoelectric mirror devices as shown in FIGS. 1, 2 and 3 were obtained following Example 1 with the exception that a Cu thin film (of 2 μm (2,000 nm) in thickness) having a Young's modulus of 130 GPa was formed by sputtering into an electrode film.

EXAMPLE 9

Such individual piezoelectric mirror devices as shown in FIGS. 1, 2 and 3 were obtained following Example 1 with the exception that an Au thin film (of 1 μm (1,000 nm) in thickness) having a Young's modulus of 82.7 GPa was formed by sputtering into an electrode film.

COMPARATIVE EXAMPLE

Piezoelectric mirror devices were obtained following Example 2 with the exception that a mirror portion and mirror support portions were formed of Si having a Young's modulus of 166.0 GPa.

[Estimations]

With the respective piezoelectric mirror devices of Examples 1-9 and the comparative example, ac voltage (±25 V, 50 Hz) was applied to the upper electrodes under the following conditions while the lower electrodes were at a GND potential to measure the angles of deviation of the mirror portions. The results are tabulated in Table 1 given below.

TABLE 1

| Piezo-electric Mirror Device | Material | Young's Modulus (GPa) | Thickness (nm) | Young's Modulus of the Multilayer Structure (Calculated Values) (GPa) | Angle of Deviation |
|---|---|---|---|---|---|
| Ex. 1 | Ti | 115 | 30 | 79.1 | ±20~25 |
|  | Au | 78 | 1000 |  |  |
| Ex. 2 | Ti | 115 | 30 | 79.1 | ±20~25 |
|  | Au | 78 | 1000 |  |  |
| Ex. 3 | Ti | 115 | 30 | 79.1 | ±20~25 |
|  | Au | 78 | 1000 |  |  |
| Ex. 4 | Ti | 115 | 50 | 78.4 | ±20~25 |
|  | Au | 78 | 5000 |  |  |
| Ex. 5 | Ti | 115 | 200 | 84.2 | ±20~25 |
|  | Au | 78 | 1000 |  |  |
| Ex. 6 | Au | 78 | 1000 | — | ±20~25 |
| Ex. 7 | Ti | 115 | 400 | 152.9 | ±15~20 |
|  | Pt | 168 | 1000 |  |  |
| Ex. 8 | Cu | 130 | 2000 | — | ±17~25 |
| Ex. 9 | Ag | 82.7 | 1000 | — | ±20~25 |
| Comp. Ex. | Si | 166 | 1000 | — | ±7~10 |

As can be seen from Table 1, the angles of deviation of the mirror portions of the respective piezoelectric mirror devices according to Examples 1 to 9 were much larger than that of the mirror portion of the comparative piezoelectric mirror device.

Industrial Applicability

The invention is applicable to the fabrication or the like of piezoelectric mirror devices making use of a piezoelectric element for driving mirror portions.

What I claim is:

1. A piezoelectric mirror device, comprising:
a frame portion having a centrally located opening;
a pair of drive portions that each have a multilayer structure of a lower electrode, a piezoelectric element and an upper electrode and are located at said frame portion;
a mirror portion positioned at said opening; and
a pair of mirror support portions adapted to support said mirror portion rotatably relative to said frame portion depending on operation of said drive portions, said drive portions being configured to rotate the mirror portion via the mirror support portions, and a center axis of the mirror support portions coincides with a location of the drive portions,
wherein said mirror portion, said mirror support portions, and said lower electrode are formed integrally such that they are formed continuously of an electrically conductive material having a Young's modulus of up to 160 GPa, and said frame portion includes a cutout or thinner portion at a part of a site where there are said drive portions positioned, wherein said cutout or thinner portion is in contact with said opening.

2. The piezoelectric mirror device according to claim 1, wherein said mirror portion has a mirror surface formed of a material different from that of said mirror support portions.

3. The piezoelectric mirror device according to claim 1, wherein said mirror support portions are located in opposite directions via said mirror portion and coaxially.

4. The piezoelectric mirror device according to claim 3, wherein an axial center of said mirror support portions is off a center of said mirror portion.

5. The piezoelectric mirror device according to claim 1, wherein the lower electrode of each of the pair of drive portions is connected to a ground terminal on the frame portion and the upper electrode of each of the pair of drive portions is connected to a voltage terminal on the frame portion.

6. The piezoelectric mirror device according to claim 1, wherein the material having a Young's modulus of up to 160 GPa includes is one of Al, Au, Ag, Cu, Zn, and Ti.

7. The piezoelectric mirror device according to claim 1, wherein said mirror support portions are formed integrally with the lower electrode constituting a part of said drive portions but not with the upper electrode constituting a part of said drive portions.

8. A piezoelectric mirror device, comprising:
a frame portion having a centrally located opening;
a pair of drive portions that each have a multilayer structure of a lower electrode, a piezoelectric element and an upper electrode and are located at said frame portion;
a mirror portion positioned at said opening; and
a pair of mirror support portions adapted to support said mirror portion rotatably relative to said frame portion depending on operation of said drive portions,
wherein said mirror support portions are formed of a material having a Young's modulus of up to 160 GPa, and said frame portion includes a cutout or thinner portion at a part of a site where there are said drive portions positioned, wherein said cutout or thinner portion is in contact with said opening,
the piezoelectric mirror device further comprising:
an inner frame portion defined by said frame portion, X-axis mirror support portions defined by said mirror support portions and X-axis drive portions defined by said drive portions, and further comprising an outer frame portion positioned in such a way as to surround said inner frame portion via the opening, a pair of Y-axis drive portions that are a multilayer structure of the lower electrode, the piezoelectric element and the upper electrode and located at said outer frame portion, and a pair of Y-axis mirror support portions adapted to support said inner frame portion rotatably relative to said outer frame portion depending on operation of said Y-axis drive portions, wherein said Y-axis mirror support portions are formed of a material having a Young's modulus of up to 160 GPa, and said outer frame portion includes a cutout or thinner portion at a part of a site where there are the Y-axis drive portions positioned, wherein said cutout or thinner portion is in contact with said opening, said X-axis is orthogonal to said Y-axis, and said mirror portion is biaxially rotatable and displaceable.

9. An optical equipment comprising a light source, a projection screen and an optical system adapted to guide light leaving said light source to said projection screen, wherein said optical system includes a piezoelectric mirror device as recited in any one of claims 1 2, 3, 4, and 8.

* * * * *